United States Patent
Yoshizawa

(10) Patent No.: US 12,199,803 B2
(45) Date of Patent: *Jan. 14, 2025

(54) APPARATUS AND METHOD

(71) Applicant: Sony Group Corporation, Tokyo (JP)

(72) Inventor: Atsushi Yoshizawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 428 days.

This patent is subject to a terminal disclaimer.

(21) Appl. No.: 17/536,156

(22) Filed: Nov. 29, 2021

(65) Prior Publication Data

US 2022/0109595 A1    Apr. 7, 2022

Related U.S. Application Data

(63) Continuation of application No. 16/075,190, filed as application No. PCT/JP2016/085291 on Nov. 29, 2016, now Pat. No. 11,190,381.

(30) Foreign Application Priority Data

Feb. 12, 2016    (JP) .................................. 2016-024351

(51) Int. Cl.
*H04L 27/26*    (2006.01)
*H04L 1/00*    (2006.01)
(Continued)

(52) U.S. Cl.
CPC ........ *H04L 27/2605* (2013.01); *H04L 1/0038* (2013.01); *H04L 27/26* (2013.01);
(Continued)

(58) Field of Classification Search
CPC ... H04L 27/2605; H04L 1/0038; H04L 27/26; H04L 5/0007; H04L 5/001; H04L 5/0053;
(Continued)

(56) References Cited

U.S. PATENT DOCUMENTS

2010/0189132 A1    7/2010 Fettweis et al.
2011/0007730 A1    1/2011 Han et al.
(Continued)

FOREIGN PATENT DOCUMENTS

JP    2014-526201 A    10/2014
JP    2016-500964 A    1/2016
WO    2015/099889 A1    7/2015

OTHER PUBLICATIONS

International Search Report issued Feb. 21, 2017, in PCT/JP2016/085291, filed Nov. 29, 2016.
(Continued)

*Primary Examiner* — Yu-Wen Chang
(74) *Attorney, Agent, or Firm* — XSENSUS LLP

(57) ABSTRACT

To provide a mechanism capable of appropriately notifying the reception side of the resource setting for GFDM modulation on the transmission side.
An apparatus including: a processing unit configured to variably set at least any of bandwidth of a subcarrier or time length of a subsymbol in a first resource, and store information indicating setting content of the first resource in a second resource in which predetermined values are set for the bandwidth of the subcarrier and the time length of the subsymbol.

18 Claims, 21 Drawing Sheets

(51) Int. Cl.
*H04W 28/06* (2009.01)
*H04W 56/00* (2009.01)
*H04W 72/04* (2023.01)
*H04W 72/0453* (2023.01)
*H04B 7/0413* (2017.01)
*H04L 5/00* (2006.01)

(52) U.S. Cl.
CPC ....... *H04W 28/065* (2013.01); *H04W 56/001* (2013.01); *H04W 72/04* (2013.01); *H04W 72/0453* (2013.01); *H04B 7/0413* (2013.01); *H04L 5/0007* (2013.01); *H04L 5/001* (2013.01); *H04L 5/0053* (2013.01)

(58) Field of Classification Search
CPC . H04W 28/065; H04W 56/001; H04W 72/04; H04W 72/0453; H04B 7/0413
See application file for complete search history.

(56) References Cited

U.S. PATENT DOCUMENTS

| | | | |
|---|---|---|---|
| 2014/0126498 A1 | 5/2014 | Koorapaty et al. | |
| 2014/0192925 A1 | 7/2014 | Li | |
| 2014/0211775 A1 | 7/2014 | Sampath et al. | |
| 2015/0256308 A1 | 9/2015 | Ma et al. | |
| 2015/0264683 A1 | 9/2015 | Kim et al. | |
| 2017/0048889 A1 | 2/2017 | Kadous et al. | |
| 2018/0007673 A1 | 1/2018 | Fwu et al. | |
| 2018/0191473 A1 | 7/2018 | Ashraf et al. | |
| 2019/0037566 A1* | 1/2019 | Zhang | H04W 72/0453 |
| 2019/0045553 A1* | 2/2019 | Zhang | H04W 56/001 |
| 2019/0253292 A1* | 8/2019 | Abdoli | H04W 72/0453 |
| 2020/0205154 A1* | 6/2020 | Yoo | H04L 5/0055 |
| 2020/0260481 A1* | 8/2020 | Sun | H04W 72/1273 |
| 2021/0367723 A1* | 11/2021 | Zhang | H04L 5/0094 |

OTHER PUBLICATIONS

Michailow, N et al., "Generalized Frequency Division Multiplexing for 5th Generation Cellular Networks", IEEE Transactions on Communications, vol. 62, No. 9, Sep. 2014, pp. 3045-3061.

Michailow, N. et al., "Generalized Frequency Division Multiplexing for 5th Generation Cellular Networks", IEEE Transactions on Communications, pp. 1-18.

Gaspar, I. et al., "Frequency-Shift offset-QAM for Gfdm", IEEE Communications Letters, vol. 19, No. 8, Aug. 2015, pp. 1454-1457.

Gaspar, I. et al., "Synchronization using a Pseudo-Circular Preamble for Generalized Frequency Division Multiplexing in Vehicular Communication", 2015 IEEE 82n, Vehicular Technology Conference (VTC Fall), Sep. 9. 2015, 6 pages.

Extended European Search Report dated Feb. 12, 2019, issued in corresponding European Application No. 16889925.0, 8 pages.

* cited by examiner

APPARATUS AND METHOD

CROSS-REFERENCE TO RELATED APPLICATIONS

This application is a continuation of U.S. application Ser. No. 16/075,190, filed Aug. 3, 2018, which is based on PCT filing PCT/JP2016/085291, filed Nov. 29, 2016, and claims priority to Japanese Patent Application No. 2016-024351, filed Feb. 12, 2016, the entire contents of each are incorporated herein by its reference.

TECHNICAL FIELD

The present disclosure relates to an apparatus and a method.

BACKGROUND ART

In recent years, as a representative of multicarrier modulation techniques (that is, multiplexing techniques or multiple access technologies), orthogonal frequency division multiplexing (OFDM) and orthogonal frequency division multiple access (OFDMA) have been put to practical use in various wireless systems. Application examples include digital broadcasting, a wireless LAN, and a cellular system. OFDM has resistance with respect to a multipath propagation path and can prevent the occurrence of inter-symbol interference caused by a multipath delay wave by employing a cyclic prefix (CP). On the other hand, OFDM has a disadvantage in that a level of out-of-band radiation is large. Further, a peak-to-average power ratio (PAPR) tends to increase, and there is also a disadvantage in which it is vulnerable to distortion occurring in transmission and reception apparatus.

New modulation techniques capable of suppressing such out-of-band radiation which is a disadvantage of OFDM are emerging. These modulation techniques introduce a new concept called a subsymbol and can design a time and a frequency of a symbol flexibly by dividing one symbol into an arbitrary number of subsymbols. Further, these modulation techniques can reduce unnecessary out-of-band signal radiation by applying a pulse shaping filter to a symbol and performing waveform shaping, and the frequency use efficiency is expected to be improved. Further, the present modulation technology makes it possible to more flexibly set a resource by introducing a subsymbol, and thus serves as a means for expressing diversity that is going to be desired in the future.

These modulation techniques have various names such as universal filtered-OFDM (UF-OFDM), universal filtered multi-carrier (UFMC), filter bank multi-carrier (FBMC), and generalized OFDM (GOFDM). Particularly, since these modulation techniques can be regarded as generalized OFDM, they are also referred to as generalized frequency division multiplexing (GFDM), and this name is employed in this specification. A basic technology related to GFDM is disclosed, for example, in Patent Literature 1 and Non-Patent Literature 1.

CITATION LIST

Patent Literature

Patent Literature 1: US Patent Publication No. 2010/0189132A1

Non-Patent Literature

Non-Patent Literature 1: N. Michailow, et al., "Generalized Frequency Division Multiplexing for 5th Generation Cellular Networks," IEEE Trans. Commun., Vol. 62, no. 9, Sep. 2014.

Disclosure of Invention

Technical Problem

In GFDM, it is possible to flexibly perform resource setting such as setting subsymbol length and subcarrier frequency, in other words, to setting the number of subsymbols and the number of subcarriers in a unit resource. However, if the resource setting for GFDM modulation on the transmission side is not known to the reception side, demodulation on the reception side is difficult. Therefore, it is desirable to provide a mechanism capable of appropriately notifying the reception side of the resource setting for GFDM modulation on the transmission side.

Solution to Problem

According to the present disclosure, there is provided an apparatus including: a processing unit configured to variably set at least any of bandwidth of a subcarrier or time length of a subsymbol in a first resource, and store information indicating setting content of the first resource in a second resource in which predetermined values are set for the bandwidth of the subcarrier and the time length of the subsymbol.

In addition, according to the present disclosure, there is provided an apparatus including: a processing unit configured to demodulate a second resource in which information indicating setting content of a first resource in which at least any of bandwidth of a subcarrier or time length of a subsymbol is variably set is stored, and predetermined values are set for the bandwidth of the subcarrier and the time length of the subsymbol, and demodulate the first resource on a basis of the information indicating the setting content of the first resource.

In addition, according to the present disclosure, there is provided a method including: variably setting at least any of bandwidth of a subcarrier or time length of a subsymbol in a first resource, and storing, by a processor, information indicating setting content of the first resource in a second resource in which predetermined values are set for the bandwidth of the subcarrier and the time length of the subsymbol.

In addition, according to the present disclosure, there is provided a method including: demodulating a second resource in which information indicating setting content of a first resource in which at least any of bandwidth of a subcarrier or time length of a subsymbol is variably set is stored, and predetermined values are set for the bandwidth of the subcarrier and the time length of the subsymbol, and demodulating, by a processor, the first resource on a basis of the information indicating the setting content of the first resource.

Advantageous Effects of Invention

According to the present disclosure as described above, there is provided a mechanism capable of appropriately notifying a reception side of resource setting for GFDM modulation on a transmission side. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
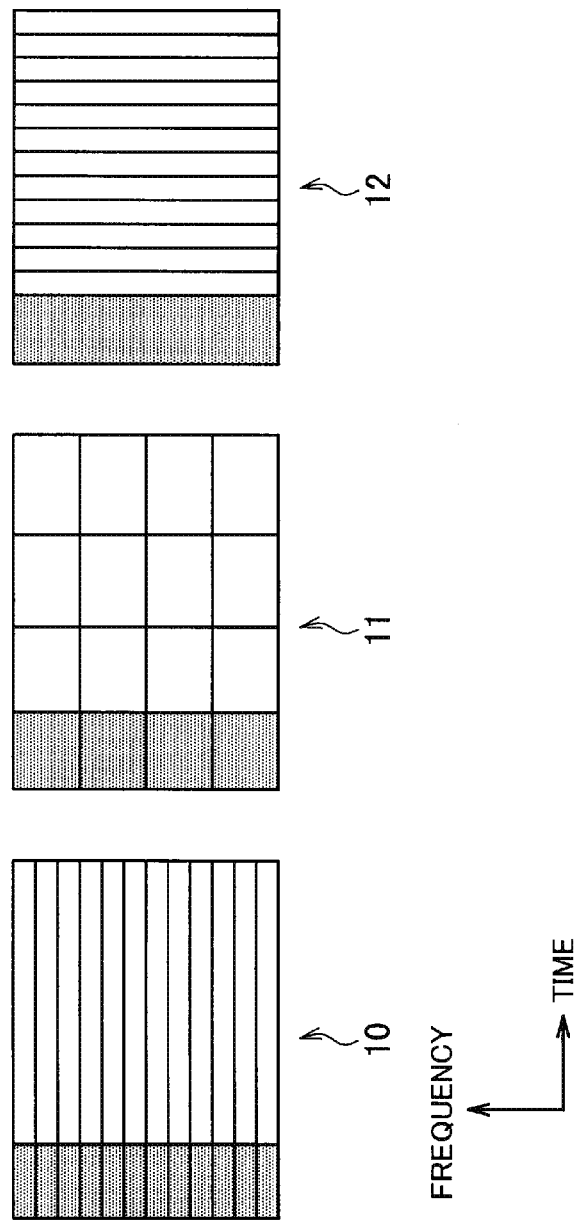
FIG. 1 is an explanatory diagram for describing a technique related to GFDM.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will proceed in the following order.
1. Instruction
1.1. GFDM
1.2. Technical problem
2. Schematic configuration of system
3. Configurations of each apparatus
3.1. Configuration of base station
3.2. Configuration of terminal apparatus
4. Technical features
4.1. Basic technology
4.2. Application to carrier aggregation
4.3. Supplemental information
4.4. GFDM signal processing
4.5. Processing flow
5. Application examples
6. Conclusion

1. INTRODUCTION

<1.1. GFDM>

First, GFDM will be described with reference to FIGS. 1 to 3.

FIG. 1 is an explanatory diagram for describing a concept of a symbol in GFDM. A reference numeral 10 indicates resources (which are also referred to as radio resources. Note that the radio resources correspond to a unit resource) per symbol in OFDM. In the resources indicated by the reference numeral 10, one symbol interval is occupied by a single symbol, and a plurality of subcarriers are included in a frequency direction. Further, in OFDM, a CP is added to each symbol. A reference numeral 12 indicates resources of an interval corresponding to one symbol of OFDM in a single carrier frequency division multiplexing (SC-FDM) signal. The resources indicated by the reference numeral 12 are exclusively used by a single symbol over a carrier frequency, have a smaller symbol length than that in OFDM, and include a plurality of symbols in a time direction. A reference numeral 11 indicates resources of an interval corresponding to one symbol of OFDM in GFDM. The resources indicated by the reference numeral 11 have an intermediate structure between the resources indicated by the reference numeral 10 and the resources indicated by the reference numeral 12. In other words, in GFDM, an interval corresponding to one symbol of OFDM is divided into an arbitrary number of subsymbols, and the number of subcarriers is smaller than that of OFDM accordingly. The structure of such resources makes it possible to change the symbol length in accordance with a parameter and to provide a more flexible transmission format. Note that, in GFDM, it is desirable that the value of the product of the number of subcarriers and the number of subsymbols be a predetermined value.

Figure 2:
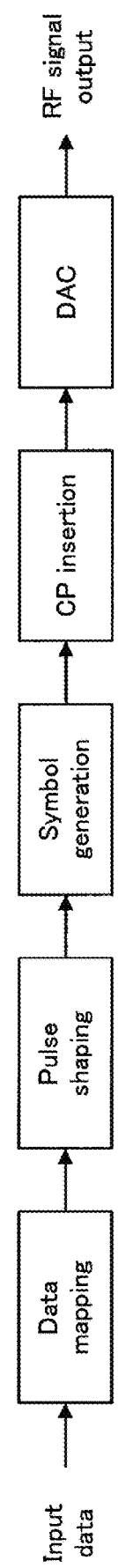
FIG. 2 is an explanatory diagram for describing a technique related to GFDM.
Figure 3:
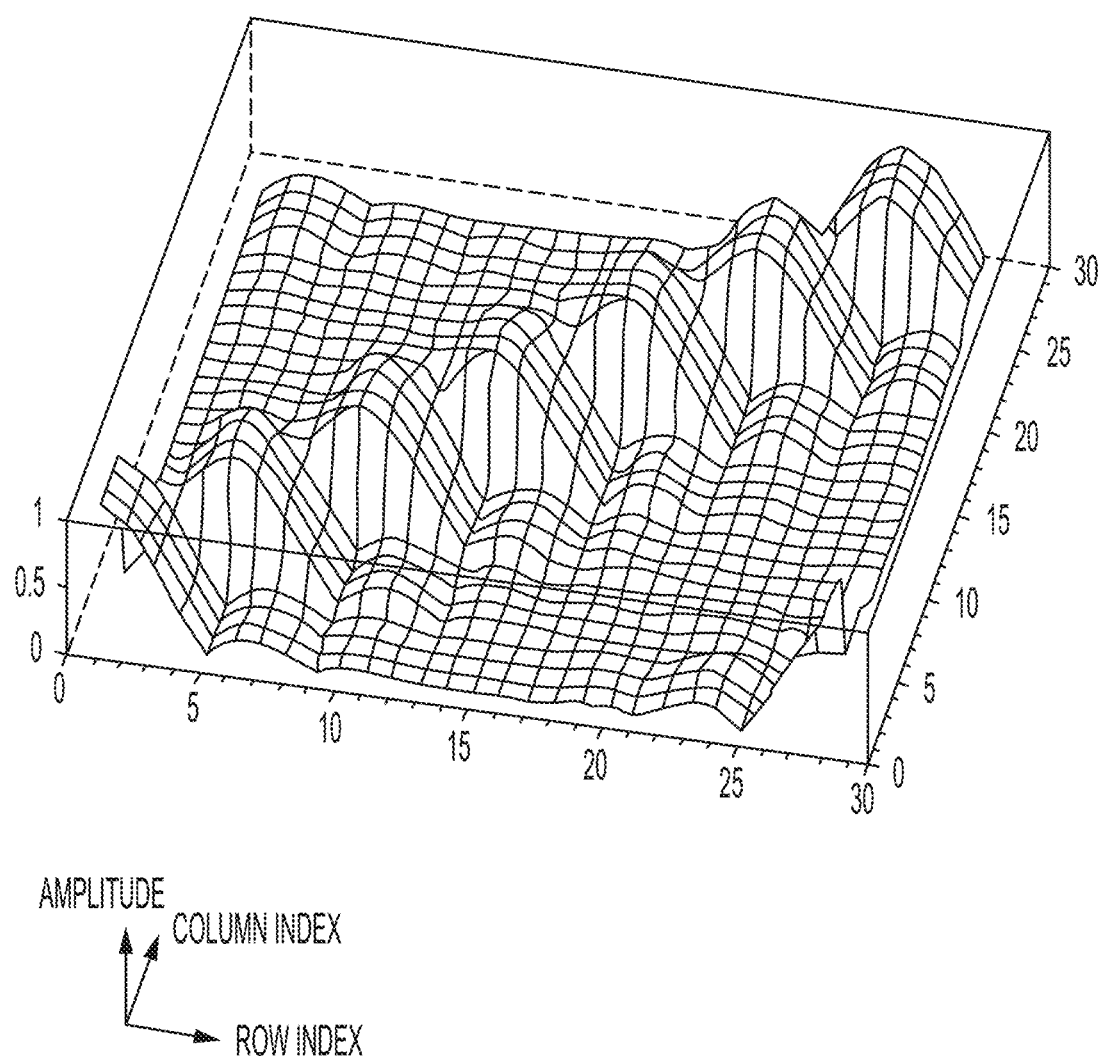
FIG. 3 is an explanatory diagram for describing a technique related to GFDM.

FIG. 2 is a diagram illustrating an example of a configuration example of a transmission apparatus supporting GFDM. First, if data is input, the transmission apparatus performs mapping of input data in order to apply filtering corresponding to the number of subcarriers and the number of subsymbols which are variably set. Further, here, the mapping for the subsymbol has an effect equivalent to that when over sampling is performed as compared with OFDM. Then, the transmission apparatus applies a pulse shaping filter to a predetermined number of subcarriers and a predetermined number of subsymbols (more specifically, multiplies by a predetermined filtering coefficient). Then, the transmission apparatus performs a frequency-time transform on a waveform after pulse shaping, and generates a symbol. Finally, the transmission apparatus adds a CP, applies a digital to analog converter (DAC), and outputs a radio frequency (RF) signal to a high frequency circuit.

Here, GFDM modulation is indicated by the following formula.

[Math. 1]

$$g_{k,m}[n] = g[(n - mK) \bmod N] \cdot \exp\left[j2\pi\frac{k}{K}n\right] \quad (1)$$

[Math. 2]

$$x[n] = \sum_{m=0}^{M-1}\sum_{k=0}^{K-1} g_{k,m}[n] \cdot d_{k,m} \quad (2)$$

Here, K represents the number of subcarriers, M represents the number of subsymbols, $d_{k,m}$ is input data corresponding to an m-th subsymbol of a k-th subcarrier, x[n] is an n-th value of N (=KM) pieces of output data, and $g_{k,m}[n]$ is a coefficient of a filter.

The n-th output sample value x[n] of a GFDM symbol is obtained by summing all values obtained by multiplying the GFDM coefficients corresponding to the mapped input data. When n varies from 0 to N, the filter coefficient varies in accordance with the above-described formula (2), and a total of N sample values are obtained per symbol. As a result, a sample value of a time waveform obtained by performing over sampling on the subsymbol K times is generated. In this case, K times M subsymbols, that is, KM (=N), output values are obtained. The transmission apparatus performs D/A conversion on the GFDM symbol obtained accordingly, performs desired amplification and frequency conversion through a high frequency circuit, and then transmits resulting data from an antenna.

Further, for example, a raised cosine (RC) filter, a root raised cosine (RRC) filter, an isotropic orthogonal transfer algorithm (IOTA) filter, or the like can be employed as the pulse shaping filter.

A relation between input data (vector) and output data (vector) in the formulated GFDM modulation is indicated by a matrix A as in the following formula.

[Math. 3]

$$x = A \cdot d \quad (3)$$

The transformation matrix A is a square matrix including complex elements having a size of KM*KM. FIG. 3 is a diagram on which amplitude values (absolute values) of the elements (that is, filter coefficients) of the transformation matrix A are plotted. FIG. 3 illustrates a case in which K=4, M=7, and an RC filter (α=0.4) is employed as a prototype filter of waveform shaping.

<1.2. Technical Problem>
Conventional Art

Figure 4:
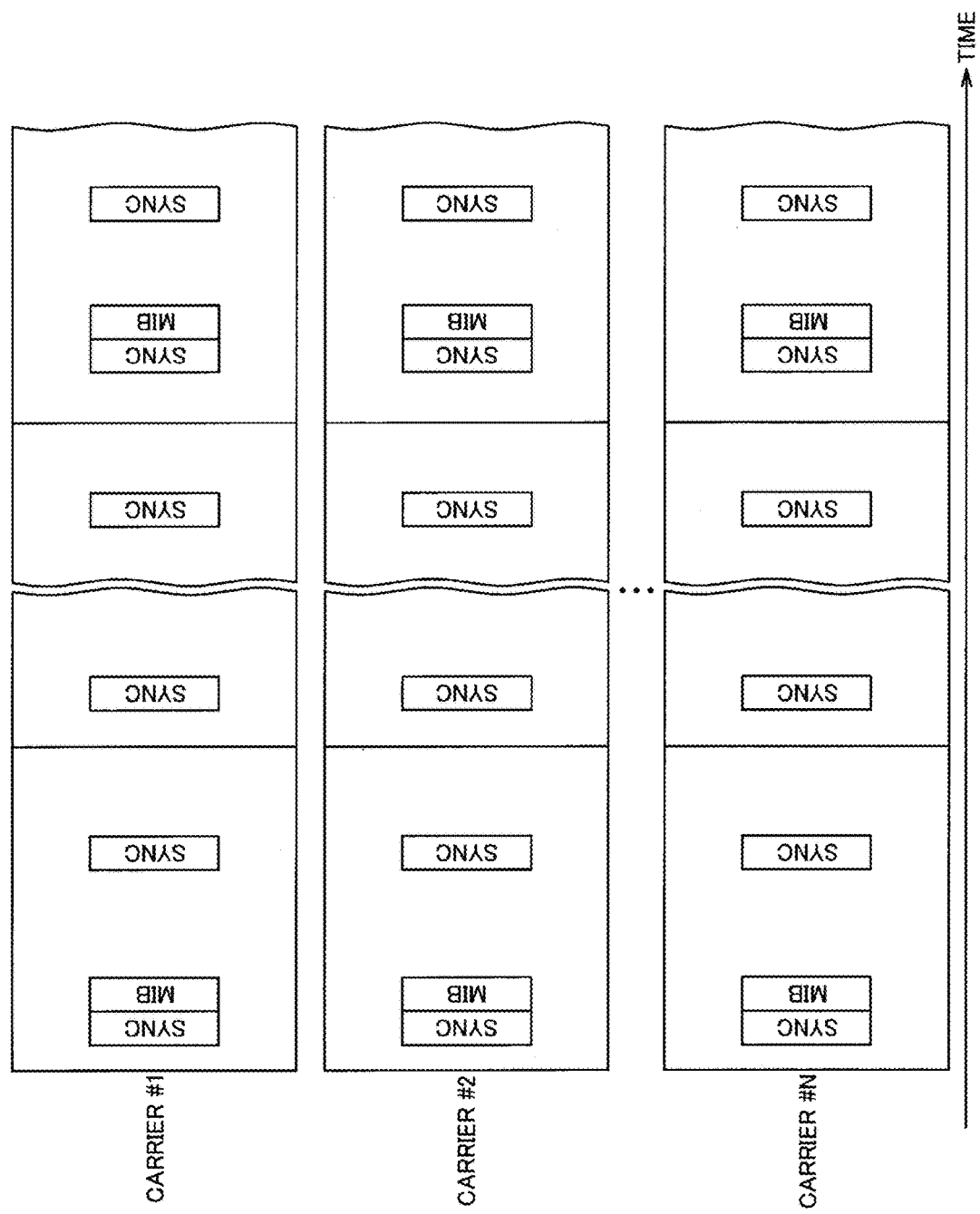
FIG. 4 is a diagram for describing transmission and reception of system information to and from a UE in LTE.

In cellular communication including LTE, a user terminal (UE: user equipment) typically receives system information regularly (i.e., periodically). The UE can acquire basic setting information regarding the cellular communication on the basis of this system information. With reference to FIG. 4, the following describes an example of the typical transmission and reception of system information in LTE.

FIG. 4 is a diagram for describing the transmission and reception of system information to and from a UE in LTE. As illustrated in FIG. 4, synchronization signals and system information are periodically transmitted in each of frequency bands (carriers #1 to #N) in LTE. The system information here may be a master information block (MIB). A notification is typically issued every 40 milliseconds (ms). Note that 40 ms correspond to 40 subframes, that is, four radio frames. The MIB is fixedly transmitted in a bandwidth of 1.4 MHz irrespective of a carrier band. The UE first receives synchronization signals such as a primary synchronization signal (PSS) and a secondary synchronization signal (SSS) to establish frame synchronization with an eNB. The UE then acquires the above-described system information transmitted at a predetermined position. The UE can know the number of antennas, bandwidth, PHICH (physical hybrid-ARQ indicator channel) setting, system frame number (SFN), and the like for multiple-input and multiple-output (MIMO) on the basis of this system information. At this time, blind detection using cyclic redundancy check (CRC) can be performed on information (e.g., the number of antennas for MIMO) implicitly included in the system information.

GFDM

Meanwhile, the resource setting can be flexibly performed in GFDM. However, if the resource setting on the transmission side is not known to the reception side, demodulation on the reception side is difficult. Therefore, it is desirable to provide a mechanism capable of appropriately notifying the reception side of the resource setting on the transmission side.

As an example of that, a mechanism is conceivable in which a UE receives an MIB to know the resource setting after establishing synchronization, and uses the resource setting to perform communication in accordance with GFDM. However, in the case where the resource setting is acquired from an MIB in accordance with blind detection using CRC, there is a concern about a considerable increase in processing load.

For example, to acquire the number of antennas for MIMO, blind detection is performed at most the same number of times as the number of combinations of values that are possible as the number of antennas for MIMO. If blind detection is also performed for the resource setting, blind detection can be performed at most the same number of times as the number of combinations of subsymbol length and subcarrier frequency or the number of subsymbols and the number of subcarriers that are possible as the resource setting. In the case where the values of these combinations are large, the processing load for blind detection can be enormously heavy.

It is then desirable that the resource setting be explicitly included in system information to eliminate blind detection using CRC. Further, it is desirable that the resource setting of a resource in which the system information including the resource setting is stored be also known to the reception side. In addition, it is also desirable to appropriately notify a UE of the resource setting in the case where carrier aggregation is performed. In view of the above-described circumstances, the present disclosure then provides a mechanism capable of appropriately issuing a notification of the resource setting.

2. SCHEMATIC CONFIGURATION OF SYSTEM

Figure 5:
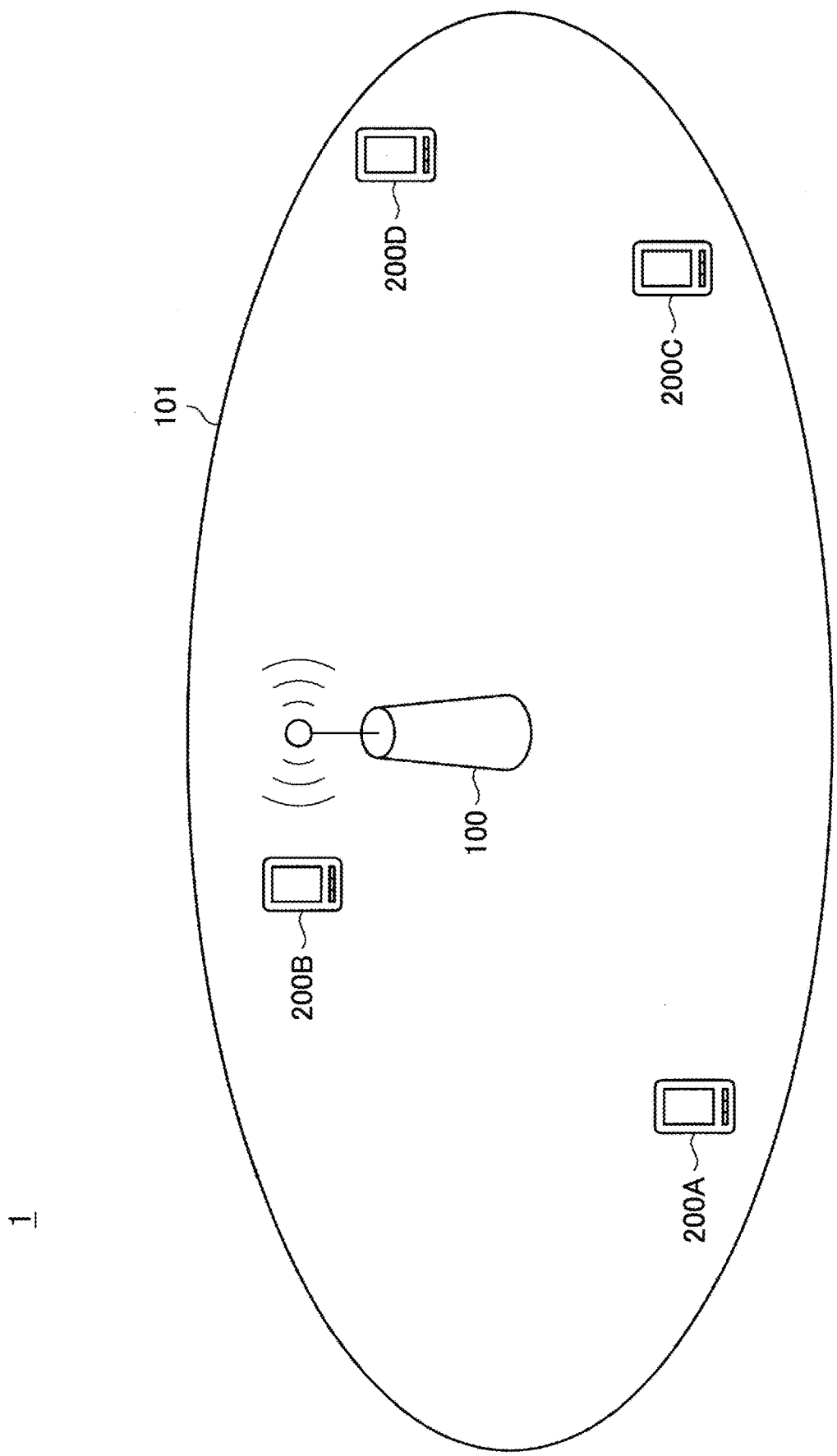
FIG. 5 is an explanatory diagram illustrating an example of a schematic configuration of a system according to the present embodiment.

Next, a schematic configuration of a system 1 according to an embodiment of the present disclosure will be described with reference to FIG. 5. FIG. 5 is an explanatory diagram illustrating an example of a schematic configuration of the system 1 according to an embodiment of the present disclosure. Referring to FIG. 5, the system 1 includes a base station 100 and a terminal apparatus 200. Here, the terminal apparatus 200 is also referred to as a "user." The user may also be referred to as "user equipment (UE)." Here, the UE may be UE defined in LTE or LTE-A or may mean a communication apparatus more generally.

(1) Base Station 100

The base station 100 is a base station of a cellular system (or a mobile communication system). The base station 100 performs wireless communication with a terminal apparatus (for example, the terminal apparatus 200) located within a cell 101 of the base station 100. For example, the base station 100 transmits a downlink signal to the terminal apparatus and receives an uplink signal from the terminal apparatus.

(2) Terminal Apparatus 200

The terminal apparatus 200 can perform communication in the cellular system (or the mobile communication system). The terminal apparatus 200 performs wireless communication with the base station of the cellular system (for example, the base station 100). For example, the terminal apparatus 200 receives a downlink signal from the base station and transmits an uplink signal to the base station.

(3) Multiplexing/Multiple Access

Particularly, in an embodiment of the present disclosure, the base station 100 performs wireless communication with a plurality of terminal apparatuses via orthogonal multiple access/non-orthogonal multiple access. More specifically, the base station 100 performs wireless communication with a plurality of terminal apparatuses 200 through multiplexing/multiple access using GFDM.

For example, the base station 100 performs wireless communication with a plurality of terminal apparatuses 200 by multiplexing/multiple access using GFDM in the downlink. More specifically, for example, the base station 100 multiplexes signals destined for a plurality of terminal apparatuses 200 using GFDM. In this case, for example, the terminal apparatus 200 removes one or more other signals serving as interference from a multiplexed signal including a desired signal (that is, a signal destined for the terminal apparatus 200), and decodes the desired signal.

The base station 100 may perform wireless communication with a plurality of terminal apparatuses by multiplexing/multiple access using GFDM in the uplink instead of the downlink or together with the downlink. In this case, the base station 100 may decode each of signals from the multiplexed signal including the signals transmitted from a plurality of terminal apparatuses.

(4) Supplement

The present technology can also be applied to multi-cell systems such as heterogeneous networks (HetNet) or small cell enhancement (SCE). Further, the present technology can also be applied to MTC apparatuses and IoT apparatuses.

3. CONFIGURATION OF EACH APPARATUS

Figure 6:
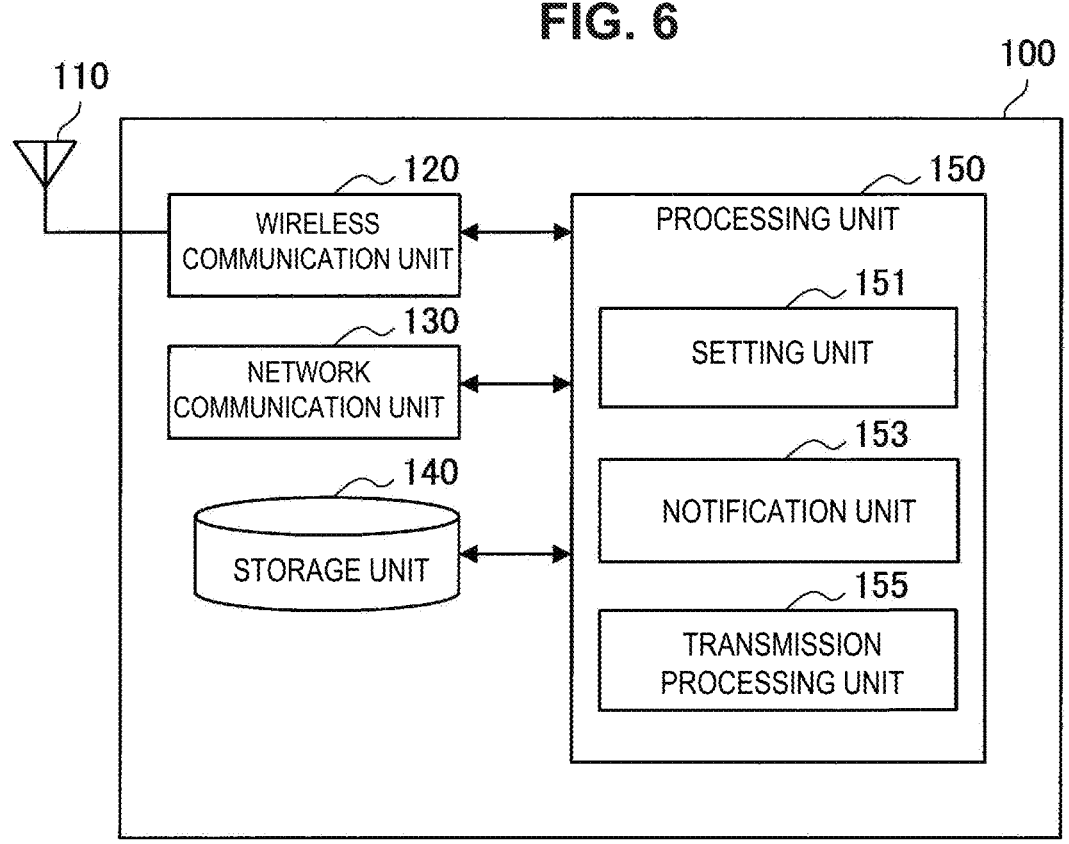
FIG. 6 is a block diagram illustrating an example of a configuration of a base station according to the present embodiment.
Figure 7:
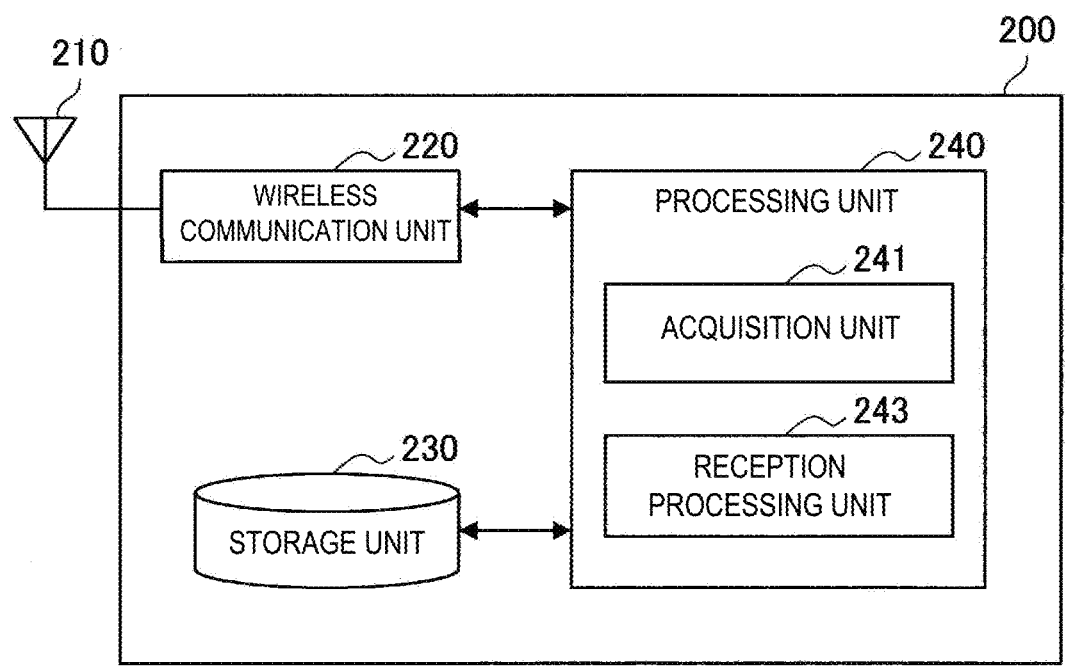
FIG. 7 is a block diagram illustrating an example of a configuration of a terminal apparatus according to the present embodiment.

Next, configurations of the base station 100 and the terminal apparatus 200 according to the present disclosure will be described with reference to FIGS. 6 and 7.

<3.1. Configuration of Base Station>

First, an example of a configuration of the base station 100 according to an embodiment of the present disclosure will be described with reference to FIG. 6. FIG. 6 is a block diagram illustrating an example of a configuration of the base station 100 according to an embodiment of the present disclosure. Referring to FIG. 6, the base station 100 includes an antenna unit 110, a wireless communication unit 120, a network communication unit 130, a storage unit 140, and a processing unit 150.

(1) Antenna Unit 110

The antenna unit 110 radiates signals outputted from the wireless communication unit 120 into space as radio waves. Further, the antenna unit 110 converts radio waves in space into signals, and outputs the signals to the wireless communication unit 120.

(2) Wireless Communication Unit 120

The wireless communication unit 120 transmits and receives signals. For example, the wireless communication unit 120 transmits a downlink signal to the terminal apparatus, and receives an uplink signal from the terminal apparatus.

(3) Network Communication Unit 130

The network communication unit 130 transmits and receives information. For example, the network communication unit 130 transmits information to other nodes and receives information from the other nodes. Examples of other nodes include other base stations and core network nodes.

(4) Storage Unit 140

The storage unit 140 temporarily or permanently stores programs and various types of data for an operation of the base station 100.

(5) Processing Unit 150

The processing unit 150 provides various functions of the base station 100. The processing unit 150 includes a setting unit 151, a notification unit 153, and a transmission processing unit 155. Note that the processing unit 150 may further include components other than these components. In other words, the processing unit 150 may also perform operations other than the operations of these components.

The functions of the setting unit 151, the notification unit 153, and the transmission processing unit 155 will be described below in detail.

<3.2. Configuration of Terminal Apparatus>

First, an example of the configuration of the terminal apparatus 200 according to an embodiment of the present disclosure will be described with reference to FIG. 7. FIG. 7 is a block diagram illustrating an example of a configuration of a terminal apparatus 200 according to an embodiment of the present disclosure. Referring to FIG. 7, the terminal apparatus 200 includes an antenna unit 210, a wireless communication unit 220, a storage unit 230, and a processing unit 240.

(1) Antenna Unit 210

The antenna unit 210 radiates signals outputted from the wireless communication unit 220 into space as radio waves.

Further, the antenna unit 210 converts radio waves in space into signals, and outputs the signals to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various types of data for an operation of the terminal apparatus 200.

(4) Processing Unit 240

The processing unit 240 provides various functions of the terminal apparatus 200. The processing unit 240 includes an acquisition unit 241 and a reception processing unit 243. Note that the processing unit 240 may further include components other than these components. In other words, the processing unit 240 may also perform operations other than the operations of these components.

The functions of the acquisition unit 241 and the reception processing unit 243 will be described below in detail.

4. TECHNICAL FEATURES

Technical features of the present embodiment will be described below under the assumption that the base station 100 is a transmission apparatus, and the terminal apparatus 200 is a reception apparatus.

<4.1. Basic Technology>

First, the basic technology will be described with reference to FIGS. 8 and 9.

(1) GFDM Modulation/Demodulation

The base station 100 performs GFDM modulation. First, the base station 100 (e.g., setting unit 151) performs resource setting for a unit resource including one or more subcarriers or one or more subsymbols. Specifically, the base station 100 variably sets at least any of the number of subcarriers or the number of subsymbols included in a unit resource. In other words, the base station 100 variably sets at least any of the bandwidth of a subcarrier or the time length of a subsymbol included in a unit resource. The base station 100 (e.g., transmission processing unit 155) then performs filtering for each subcarrier with a pulse shaping filter (i.e., multiplies a filter coefficient).

The terminal apparatus 200 according to the present embodiment receives a signal subjected to GFDM modulation and transmitted, and performs GFDM demodulation. Specifically, the terminal apparatus 200 (e.g., reception processing unit 243) receives and demodulates a signal transmitted by variably setting at least any of the number of subcarriers or the number of subsymbols (i.e., bandwidth of a subcarrier or time length of a subsymbol) included in a unit resource, and acquires data. At that time, the terminal apparatus 200 applies the pulse shaping filter corresponding to the pulse shaping filter applied on the transmission side (i.e., multiplies a filter coefficient), and performs the down sampling corresponding to the up sampling applied on the transmission side.

(2) Resource Setting

Above all, in the present embodiment, among resources that are to be subjected to GFDM modulation, different kinds of processing can be performed on a first resource and a second resource. This point will be described below in detail.

The base station 100 (e.g., setting unit 151) according to the present embodiment variably sets at least any of the bandwidth of the subcarriers or the time length of the subsymbols (i.e., the number of subcarriers or the number of subsymbols) in the first resource. The base station 100 (e.g., notification unit 153) then stores information indicating the setting content (i.e., resource setting) of the first resource in the second resource in which predetermined values are set for the bandwidth of the subcarriers and the time length of the subsymbols. Afterward, the base station 100 (e.g., transmission processing unit 155) performs GFDM modulation (i.e., filtering) on the first resource and the second resource. The predetermined values set for the bandwidth of the subcarriers and the time length of the subsymbols are also known to the terminal apparatus 200 side. Therefore, the terminal apparatus 200 demodulates the second resource, and can acquire the information indicating the resource setting of the first resource more easily. The terminal apparatus 200 can also demodulate the first resource more easily on the basis of the acquired information.

The following also refers to the information indicating the resource setting of the first resource as GFDM setting information. The GFDM setting information may be the information indicating the bandwidth of the subcarriers and the time length of the subsymbols in a unit resource of the first resource, or the information indicating the number of subcarriers and the number of subsymbols in a unit resource of the first resource. In addition, the GFDM setting information may be information that directly indicates the resource setting of the first resource, or the index corresponding to the resource setting. In the case of the index, it is possible to reduce the information amount of the GFDM setting information as compared with the information that directly indicates the resource setting. Note that the GFDM setting information can be, for example, included in system information (MIB or system information block (SIB)).

The terminal apparatus 200 (e.g., acquisition unit 241) according to the present embodiment acquires the GFDM setting information from a demodulation result of the second resource in which the GFDM setting information is stored. The terminal apparatus 200 (e.g., reception processing unit 243) then demodulates the first resource on the basis of the acquired GFDM setting information. In this way, the terminal apparatus 200 can more easily demodulate and acquire data included in the first resource, that is, data subjected to GFDM modulation on the basis of the GFDM setting information.

The setting similar to the setting in OFDM may be performed on the second resource. That is, a predetermined value for the time length of subsymbols which is set in the second resource may be the time length of symbols in OFDM. That is, the number of the subsymbols in a unit resource may be 1. In addition, a predetermined value for the bandwidth of subcarriers which is set in the second resource may be the bandwidth of subcarriers in OFDM. This allows an existing legacy terminal supporting OFDM to demodulate the second resource to acquire system information, which secures the backward compatibility.

Here, it is desirable that the terminal apparatus 200 (e.g., acquisition unit 241) know information for identifying the position (i.e., time and frequency band) of the second resource in advance. Then, for example, a synchronization signal transmitted from the base station 100 may include the information for identifying the position of the second resource. For example, instead of the cell ID included in the synchronization signal, the information may be included, or the information may be newly added. Besides, the system information may include the information for identifying the position of the second resource. This can reduce the processing load for the terminal apparatus 200 to discover the second resource. However, while the information remains unknown (e.g., before the system information is acquired for the first time), the terminal apparatus 200 may discover the second resource according to blind detection.

Figure 8:
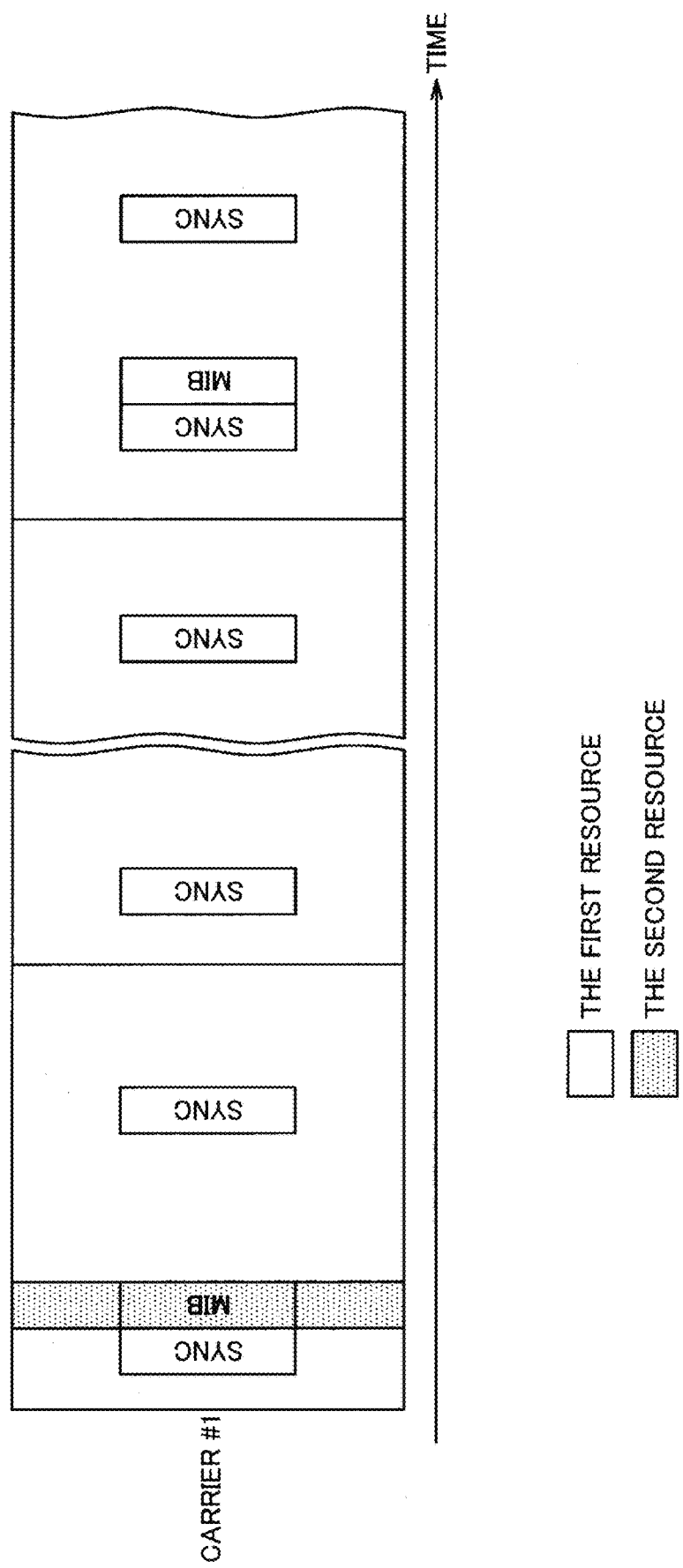
FIG. 8 is a diagram for describing an example of transmission and reception of GFDM setting information according to the present embodiment.
Figure 9:
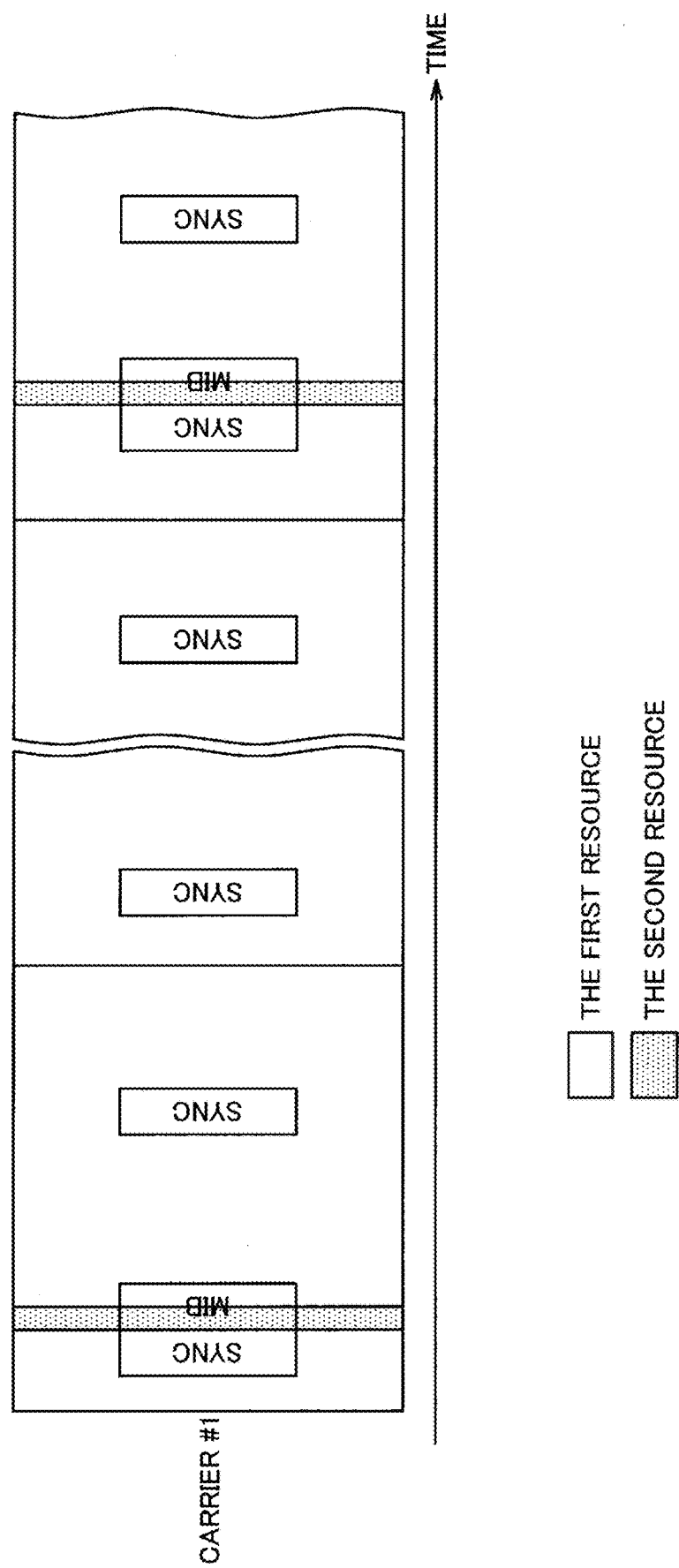
FIG. 9 is a diagram for describing an example of transmission and reception of GFDM setting information according to the present embodiment.

With reference to FIGS. 8 and 9, the following specifically describes the relationship between the first resource, the second resource, and the system information.

FIG. 8 is a diagram for describing an example of the transmission and reception of GFDM setting information according to the present embodiment. As illustrated in FIG. 8, the base station 100 periodically transmits a synchronization signal and system information in a certain frequency band (carrier #1). It should be noted here that the entirety of the system information is stored in the second resource. The GFDM setting information is included in this system information. The system information here is an MIB. The terminal apparatus 200 first receives the synchronization signal to establish frame synchronization with the base station 100. In the case where this synchronization signal includes the information for identifying the position of the second resource, the terminal apparatus 200 knows the position of the second resource on the basis of the synchronization signal. The terminal apparatus 200 then demodulates the second resource in accordance with the known resource setting to acquire the GFDM setting information included in the system information, and uses the GFDM setting information to demodulate the first resource.

Here, in FIG. 8, first one of two pieces of illustrated system information is stored in the second resource, and the following other piece of illustrated system information is stored in the first resource. If the terminal apparatus 200 can acquire the GFDM setting information from the first piece of system information, the terminal apparatus 200 can acquire the following other piece of system information by using the GFDM setting information. As illustrated in FIG. 8, some of pieces of system information that are periodically transmitted may be stored in the second resource. Needless to say, as illustrated in FIG. 9 described below, every piece of system information that is periodically transmitted may also be stored in the second resource. In other words, the second resource may be transmitted through the cycles that are the integer multiple of the cycles of the system information.

In addition, any time length is adopted for the second resource. For example, as the time length of the second resource, one or more subframes may be adopted, or one or more subsymbols may be adopted. The following describes the case where the time length of the second resource is different from the example illustrated in FIG. 8 with reference to FIG. 9.

FIG. 9 is a diagram for describing an example of the transmission and reception of GFDM setting information according to the present embodiment. As illustrated in FIG. 9, the base station 100 periodically transmits synchronization signals and system information in a certain frequency band (carrier #1). It should be noted here that a part of the system information is stored in the second resource in FIG. 9, which is different from FIG. 8. The GFDM setting information only has to be included in a part of the system information stored in this second resource. In that case, the terminal apparatus 200 uses the GFDM setting information to demodulate the first resource, and then can acquire the remaining part of system information. In addition, in the example illustrated in FIG. 9, every pieces of system information that are periodically transmitted is stored in the second resource.

<4.2. Application to Carrier Aggregation>

The basic technology described above is also applicable to carrier aggregation. With reference to FIGS. 10 to 13, the following describes an applied example to carrier aggregation.

(1) First Application Example

Figure 10:
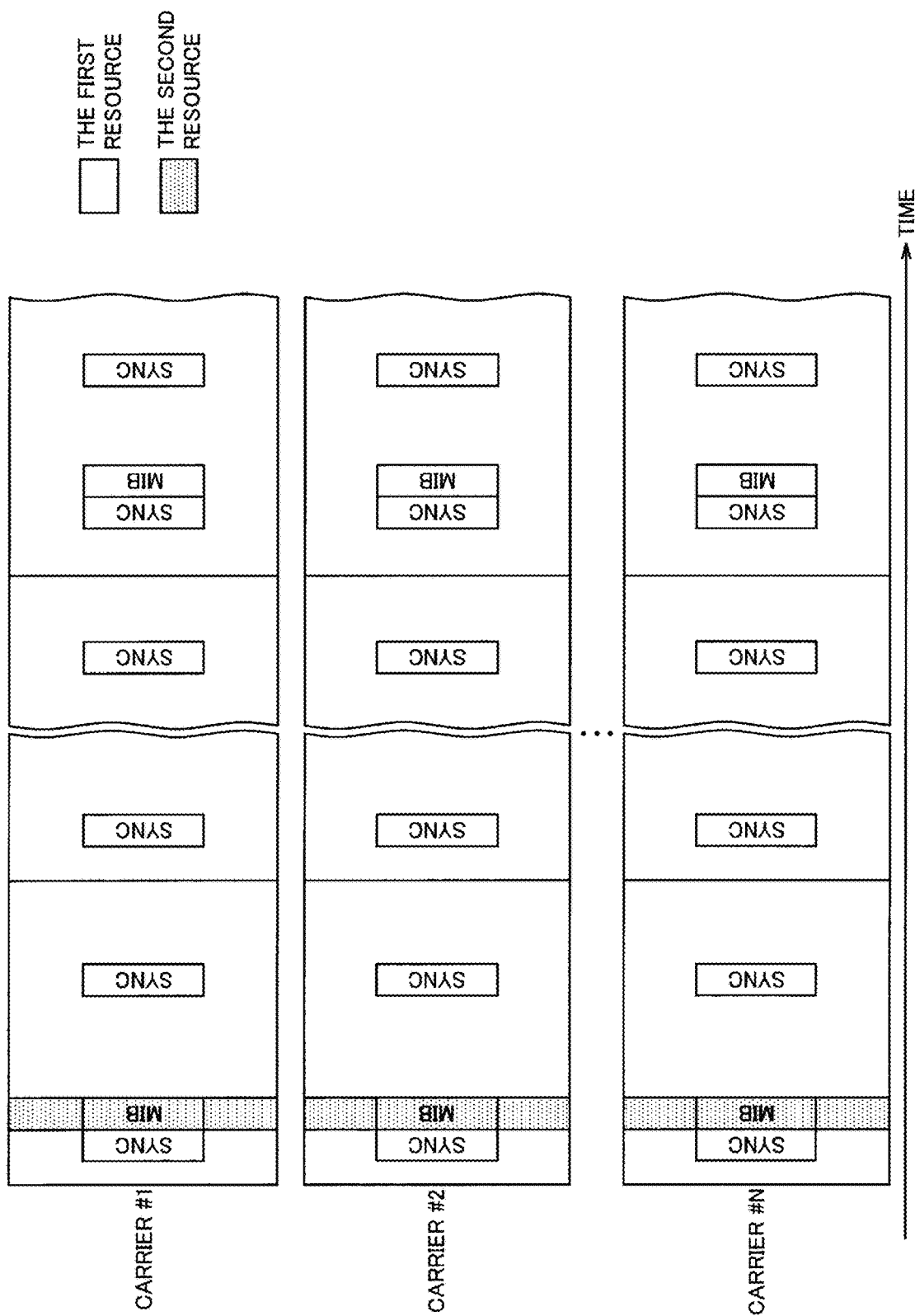
FIG. 10 is a diagram for describing an example of transmission and reception of GFDM setting information according to the present embodiment.
Figure 11:
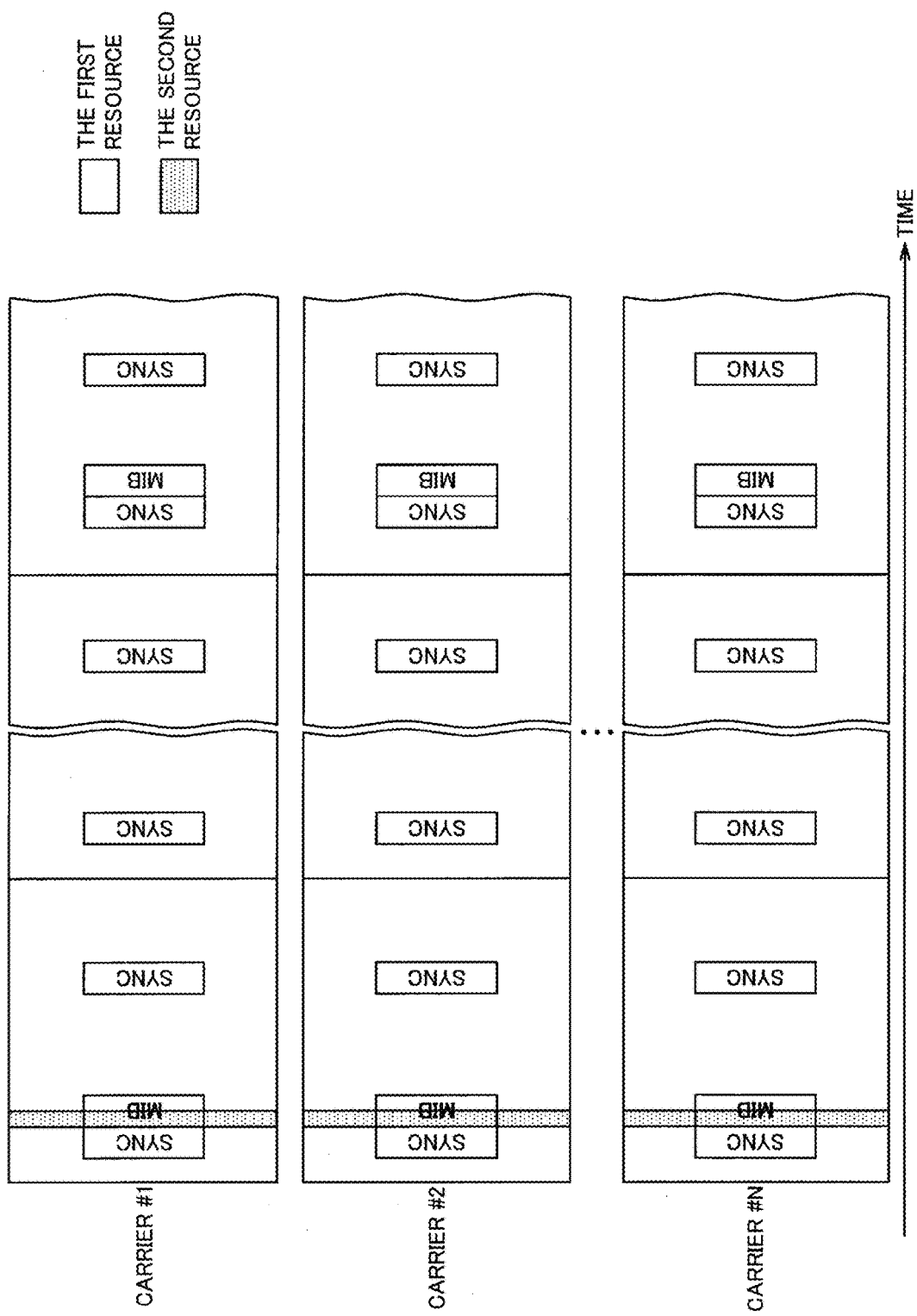
FIG. 11 is a diagram for describing an example of transmission and reception of GFDM setting information according to the present embodiment.

Each of FIGS. 10 and 11 is a diagram for describing an example of the transmission and reception of GFDM setting information according to the present embodiment. As illustrated in FIGS. 10 and 11, the first resource and the second resource may be transmitted in a plurality of frequency bands (carriers (e.g., component carriers) #1 to #N). The base station 100 periodically transmits synchronization signals and system information in a plurality of frequency bands. The terminal apparatus 200 first receives the synchronization signal to establish frame synchronization with the base station 100. Here, in FIG. 10, the entirety of the first system information is stored in the second resource. In FIG. 11, a part of the first system information is stored in the second resource. In any case, the terminal apparatus 200 demodulates the second resource to acquire the GFDM setting information included in the first system information, and uses the GFDM setting information to demodulate the first resource.

According to carrier aggregation, it is said that the terminal apparatus 200 widely receives carriers having various kinds of setting, so that the terminal apparatus 200 can improve the tolerance to fluctuation in communication environments and more flexibly support a variety of services in addition to improving communication speed. Therefore, when using a plurality of carriers to perform communication according to carrier aggregation, the base station 100 may change GFDM setting information for each carrier in accordance with the content, objective, or the like of a service.

For example, in FIG. 10, the number of subsymbols may be 1 in the carrier #1, and the number of subsymbols may be 5 in the carrier #2. Then, if the transmission speed is the same between the carrier #1 and the carrier #2, the basic characteristics of GFDM cause the bandwidth of the subcarriers of the carrier #2 to be enlarged and used to five times the carrier #1. In this case, in the carrier #2, the acceptable accuracy of the terminal apparatus 200 with respect to a frequency offset is considerably eased. More specifically, the tolerance to characteristic degrading factors such as a Doppler shift of carriers due to high-speed movement of the terminal apparatus 200 or a frequency error due to drift of a local reference clock caused by the operation of the terminal apparatus 200 in a sleep mode for a long time is improved.

Such an improvement of the tolerance of the terminal apparatus 200 to a frequency shift contributes to the lowered frequency of communication errors in the terminal apparatus 200. The frequency of retransmission is also lowered along with it, so that desirable performance improvements are also expected for delay and throughput.

(2) Second Application Example

Figure 12:
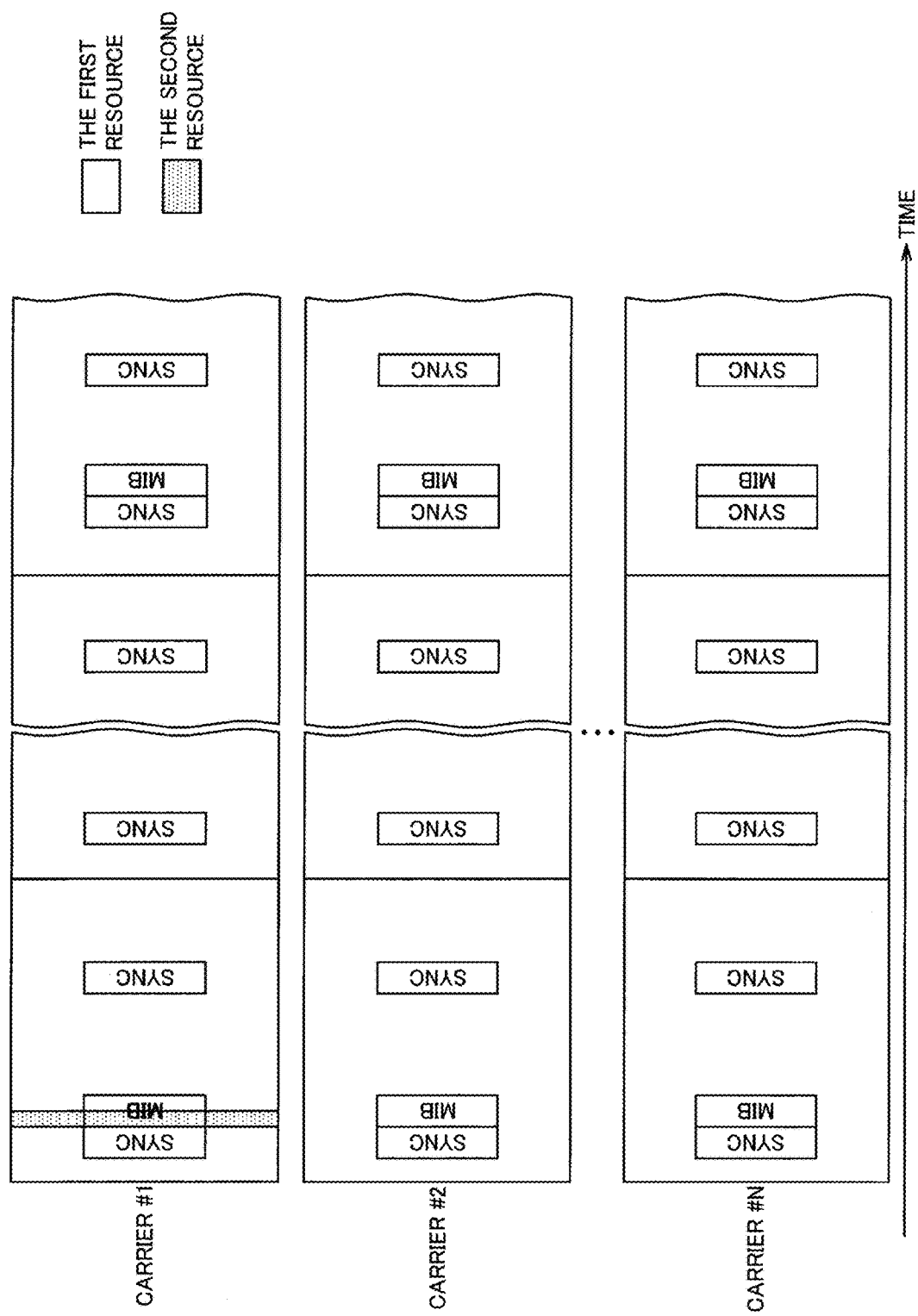
FIG. 12 is a diagram for describing an example of transmission and reception of GFDM setting information according to the present embodiment.

FIG. 12 is a diagram for describing an example of the transmission and reception of GFDM setting information according to the present embodiment. As illustrated in FIG. 12, in the carrier #1, the first resource and the second resource are transmitted. The GFDM setting information of the first resource of the carrier #1 is included in the system information stored in this second resource. In other words, the first resource and the second resource in which the GFDM setting information of the first resource is stored are transmitted in the same frequency band. Therefore, the terminal apparatus 200 demodulates the second resource of the carrier #1 to acquire the GFDM setting information of the carrier #1 included in the system information, and demodulates the first resource of the carrier #1. Meanwhile, the second resource in which the GFDM setting information of the first resource is stored is not transmitted in the carriers #2 to #N. The GFDM setting information of the first resource in these carriers #2 to #N is stored in the system information included in the second resource of the carrier #1. In other words, the first resource and the second resource in which the GFDM setting information of the first resource is stored are transmitted in different frequency bands. That is, not only the GFDM setting information of the same frequency band (carrier #1), but the GFDM setting information of the other frequency bands (carriers #2 to #N) is also included in the system information stored in the second resource of the carrier #1. Therefore, the terminal apparatus 200 demodulates the second resource of the carrier #1, and then can acquire not only the GFDM setting information of the carrier #1, but also the GFDM setting information of the carriers #2 to #N. Then, the terminal apparatus 200 demodulates the second resource of the carrier #1 to acquire the GFDM setting information of the carriers #2 to #N included in the system information, and demodulates the first resource of the carriers #2 to #N.

Note that the frequency band which includes the second resource in which the GFDM setting information is stored may be a primary cell, and the frequency band which does not include the second resource in which the GFDM setting information is stored may be a secondary cell. In that case, in the case where the GFDM setting information in the secondary cell is changed, the base station 100 can store the changed GFDM setting information in the system information of the primary cell, and notify the terminal apparatus 200 of them together. Therefore, the terminal apparatus 200 can omit monitoring the secondary cell, so that it is possible to considerably reduce power to be consumed.

(3) Third Application Example

Figure 13:
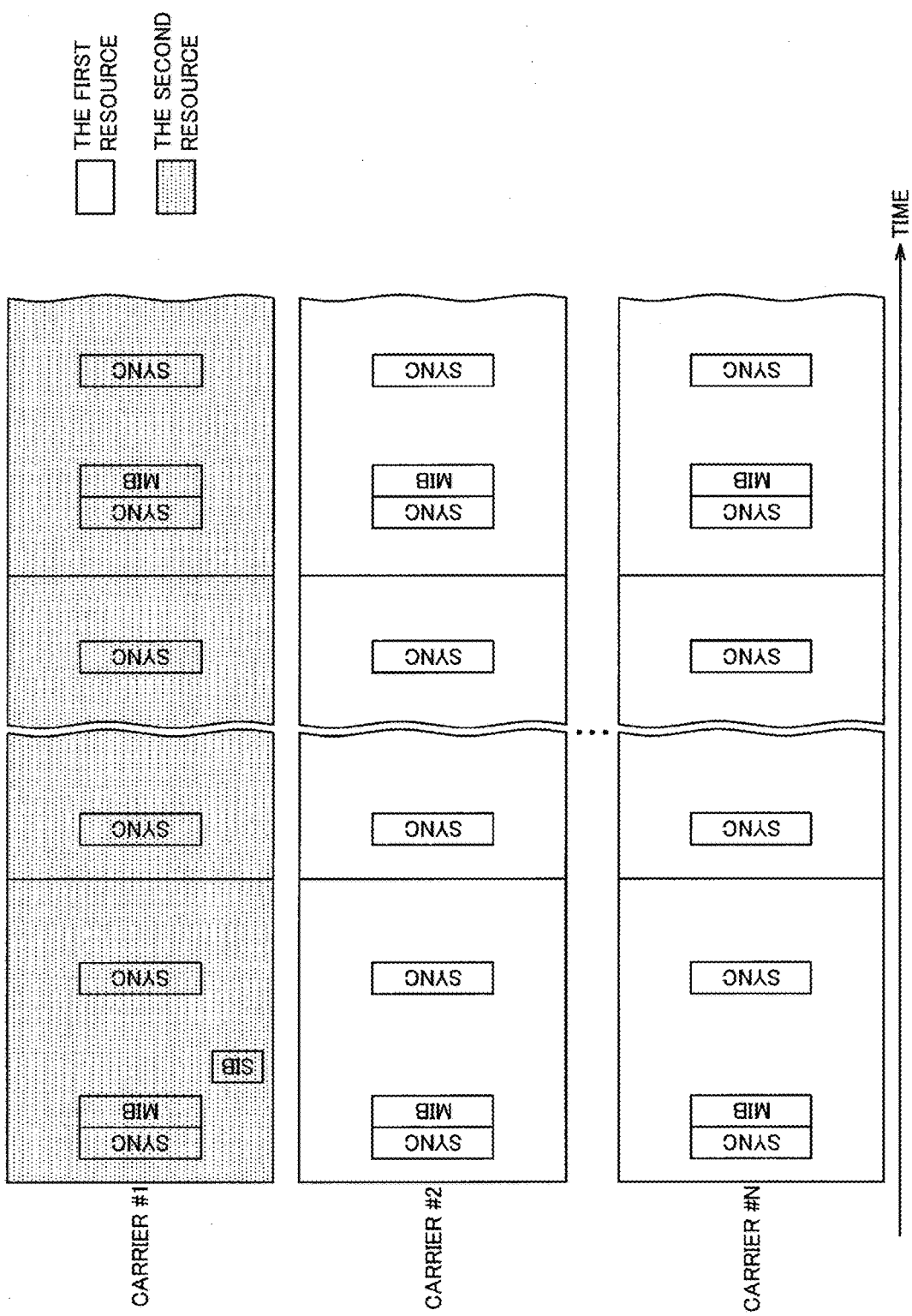
FIG. 13 is a diagram for describing an example of transmission and reception of GFDM setting information according to the present embodiment.

FIG. 13 is a diagram for describing an example of the transmission and reception of GFDM setting information according to the present embodiment. In the example illustrated in FIG. 13, the entirety of the carrier #1 is the second resource, and the entirety of the remaining carriers is the first resource. In this way, the entirety of at least one of a plurality of carriers to be transmitted may be the second resource, and the entirety of the other carriers may be the first resource. Then, the system information of the carrier #1 includes the GFDM setting information of the other frequency bands (carriers #2 to #N). Here, the GFDM setting information may be included in an SIB. In this way, in the case where the first resource and the second resource switch for each carrier, there is no need to switch the first resource and the second resource in each carrier in units of time. Accordingly, it is possible to reduce the processing load of the base station 100 and the terminal apparatus 200.

<4.3. Supplemental Information>

The above describes that a notification of the GFDM setting information is issued through the system information, but the present technology is not limited to this example. For example, the GFDM setting information may be included in an individual signaling message (e.g., dedicated signaling). This notification method is effective in the case where the GFDM setting information is changed with respect to only a specific terminal apparatus 200. In addition, regarding carrier aggregation, a notification of the GFDM setting information of a carrier to be changed may be issued according to the RRC signaling in a primary cell.

The resource setting of the first resource may be performed by a control entity that manages the plurality of base stations 100, or individually performed by each base station 100. In the former case, the control entity performs resource setting on the basis of cell load information, scheduling information, or the like provided from each base station 100 such that the throughput of each cell is optimized. In the latter case, the base station 100 performs resource setting in accordance with the situation of its own cell such that the throughput of its own cell is optimized.

<4.4. GFDM Signal Processing>

Next, GFDM signal processing will be described.

(1) Signal Processing Related to Transmission of GFDM Signal

First, with reference to FIGS. 14 and 15, signal processing related to the transmission of a GFDM signal by the base station 100 will be described.

Figure 14:
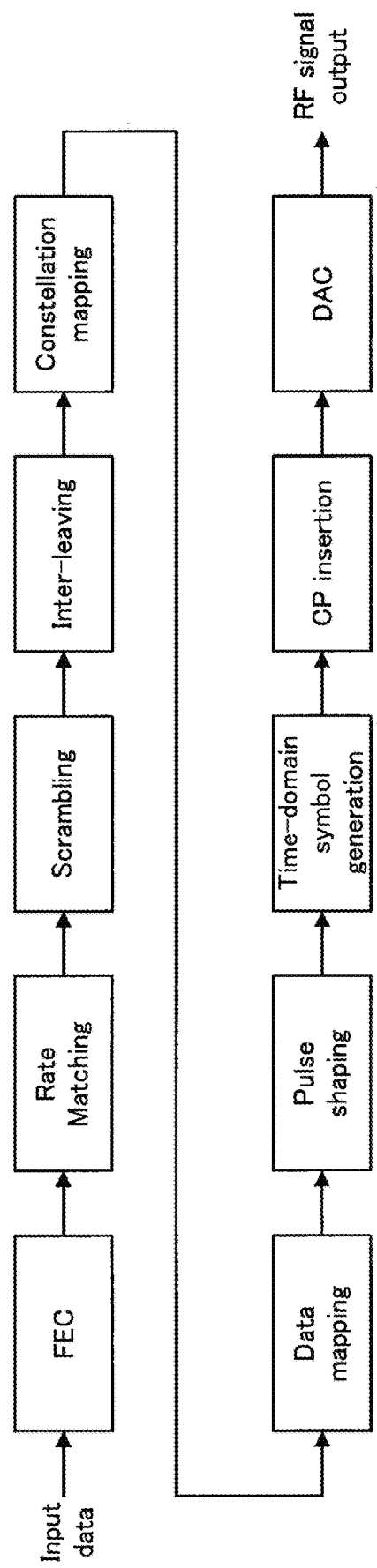
FIG. 14 is a diagram for describing an example of signal processing related to transmission of a GFDM signal by the base station according to the present embodiment.

FIG. 14 is a diagram for describing an example of the signal processing related to the transmission of a GFDM signal by the base station 100 according to the present embodiment. As illustrated in FIG. 14, the base station 100 performs forward error correction (FEC) coding, rate matching, scrambling, interleaving, and mapping (constellation mapping) from a bit string to a symbol (which may be, for example, a complex symbol or may also be referred to as a signal point) on input data.

The base station 100 performs a GFDM conversion process on the complex data obtained in this way. Specifically, the base station 100 maps the complex data to a resource in accordance with the number K of subcarriers and the number M of subsymbols indicated by GFDM setting information. Next, the base station 100 applies a pulse shaping filter to mapped input data $d_{k,m}[n]$ to obtain output data x[n] as shown in the formula (2) above. The base station 100 then generates a symbol in the time domain. Specifically, the base station 100 performs parallel-serial conversion on the output data x[n] to obtain a GFDM symbol in the time domain, that is, a GFDM time waveform.

The base station 100 then adds a CP to the GFDM symbol, applies a DAC, and outputs an RF signal. Afterward, the base station 100 uses a high-frequency circuit to perform desired amplification and frequency conversion, and then performs transmission from an antenna.

Note that each component illustrated in FIG. 14 may correspond to the transmission processing unit 155. Of course, any other correspondence relation is acceptable.

The above describes an example of the signal processing related to the transmission of a GFDM signal. Next, the signal processing related to the transmission of GFDM signal in the case of MIMO will be described with reference to FIG. 14.

Case of Multiple-Input and Multiple-Output (MIMO)

Figure 15:
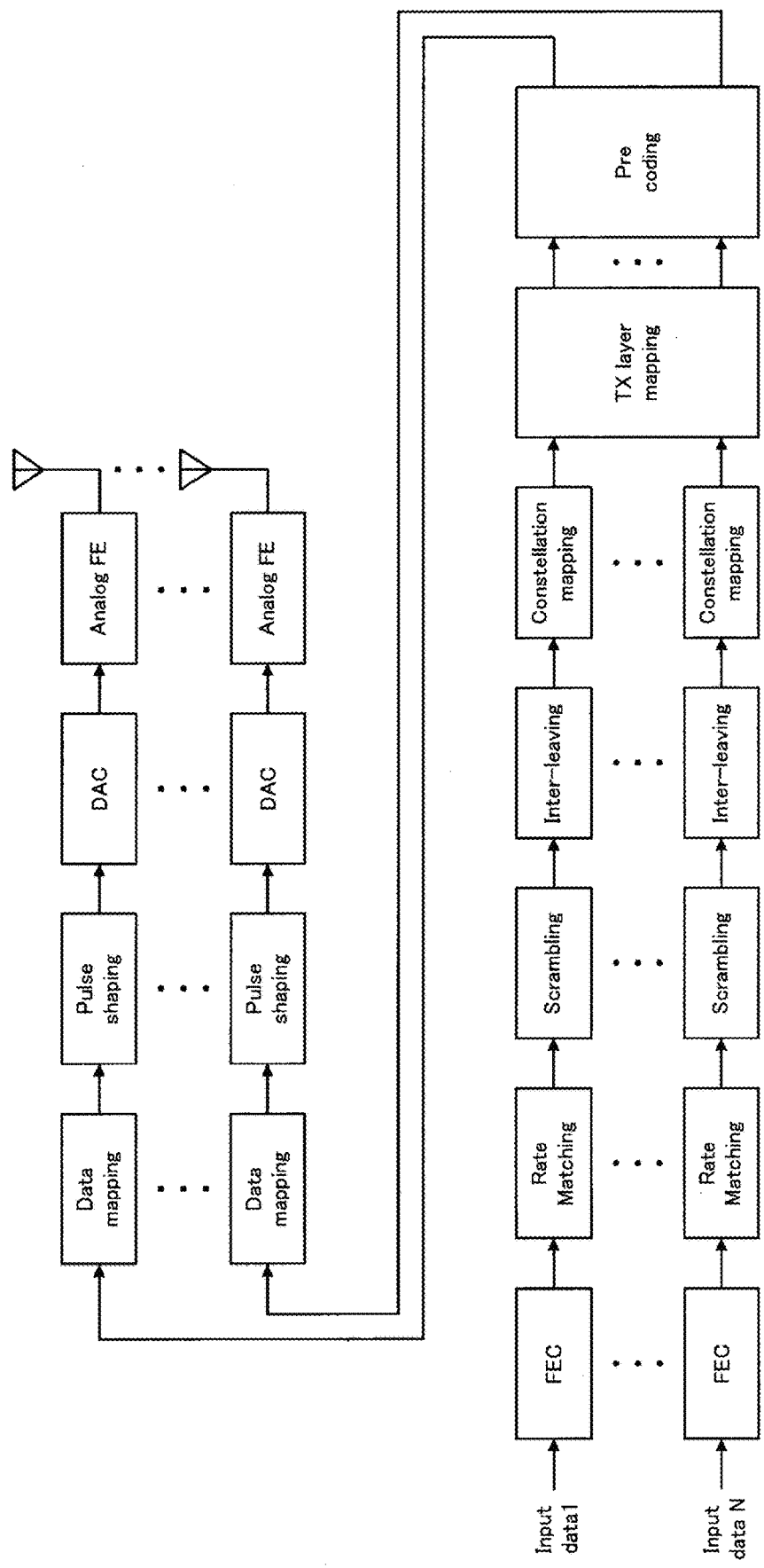
FIG. 15 is a diagram for describing an example of signal processing related to transmission of a GFDM signal according to MIMO by the base station according to the present embodiment.

FIG. 15 is a diagram for describing an example of signal processing related to the transmission of GFDM signals according to MIMO by the base station 100 according to the present embodiment. As illustrated in FIG. 15, the base station 100 performs FEC encoding, rate matching, scrambling, interleaving, and mapping from a bit string to a symbol for each pieces of transmission data to be multiplexed. Then, the transmission apparatus performs multiplexing through transmission layer mapping and performs pre coding for each multiplexed signal. A subsequent process is performed for each multiplexed signal.

The base station 100 performs a GFDM conversion process for each multiplexed signal. Specifically, the base station 100 maps the complex data to a resource in accordance with the number K of subcarriers and the number M of subsymbols indicated by GFDM setting information. Next, the base station 100 applies a pulse shaping filter to mapped input data $d_{k,m}[n]$ to obtain output data x[n] as shown in the formula (2) above. Although not illustrated in FIG. 15, the base station 100 then generates a symbol in the time domain. Specifically, the base station 100 performs parallel-serial conversion on the output data x[n] to obtain a GFDM symbol in the time domain, that is, a GFDM time waveform.

The base station 100 then applies a DAC, performs signal processing with an analog FE, and transmits a wireless signal from an antenna.

Note that the analog FE may correspond to the wireless communication unit 120, the antenna may correspond to the antenna unit 110, and the other components may correspond to the transmission processing unit 155. Of course, any other correspondence relation is acceptable.

(2) Signal Processing Related to Reception of GFDM Signal

Next, with reference to FIG. 16, signal processing related to the reception of a GFDM signal by the terminal apparatus 200 will be described. Here, the case of MIMO will be described as an example.

Figure 16:
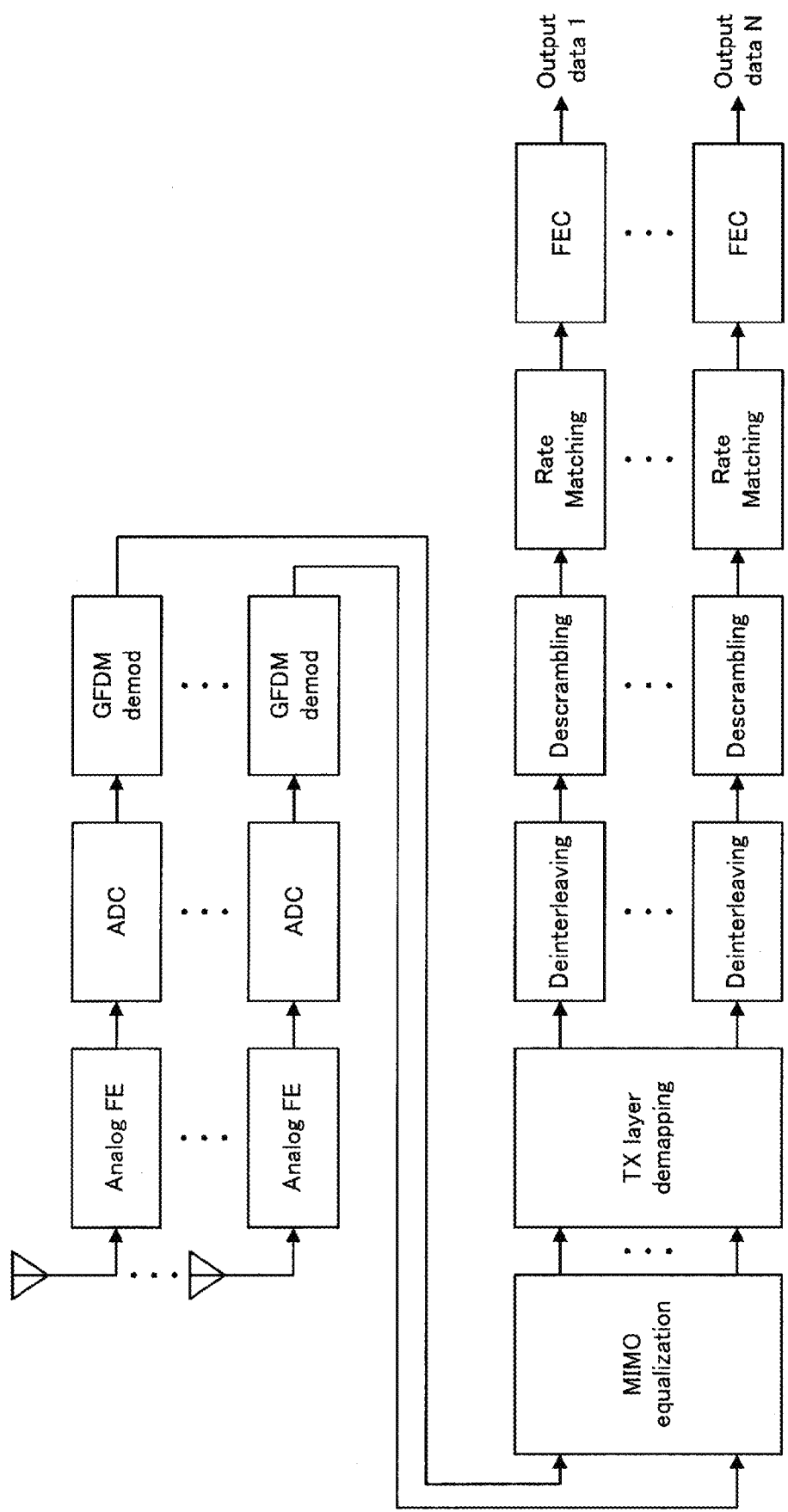
FIG. 16 is a diagram for describing an example of signal processing related to reception of a GFDM signal according to MIMO by the terminal apparatus according to the present embodiment.

FIG. 16 is a diagram for describing an example of the signal processing related to the reception of GFDM signals according to MIMO by the terminal apparatus 200 according to the present embodiment. As illustrated in FIG. 16, the terminal apparatus 200 performs signal processing performed by the analog FE, A/D conversion performed by an analog to digital converter (ADC), and GFDM demodulation on the signal received through the antenna. In a GFDM demodulator, the terminal apparatus 200 extracts original data d[0] to d[N−1] from received symbols x[0] to x[N−1]. To this end, the GFDM demodulator may be a circuit that multiplies a conjugate transpose matrix $A^H$ of A which is matching filter reception for the transformation matrix A of the GFDM used for transmission, a circuit that multiplies an inverse matrix $A^{-1}$ serving as zero force reception, a minimum mean square error (MMSE) reception circuit, or the like. Thereafter, the terminal apparatus 200 performs MIMO equalization and de-mapping of the transmission layer. Thereafter, the terminal apparatus 200 performs de-interleaving, de-scrambling, rate matching, and FEC decoding on each piece of reception data and outputs the resulting data.

Note that the analog FE may correspond to the wireless communication unit 220, the antenna may correspond to the antenna unit 210, and the other components may correspond to the reception processing unit 243. Of course, any other correspondence relation is acceptable.

<4.5. Processing Flow>

Next, the processing flow of the base station 100 and the terminal apparatus 200 will be described. Note that the above-described signal processing related to the transmission and reception of GFDM signals will not be described here.

Figure 17:
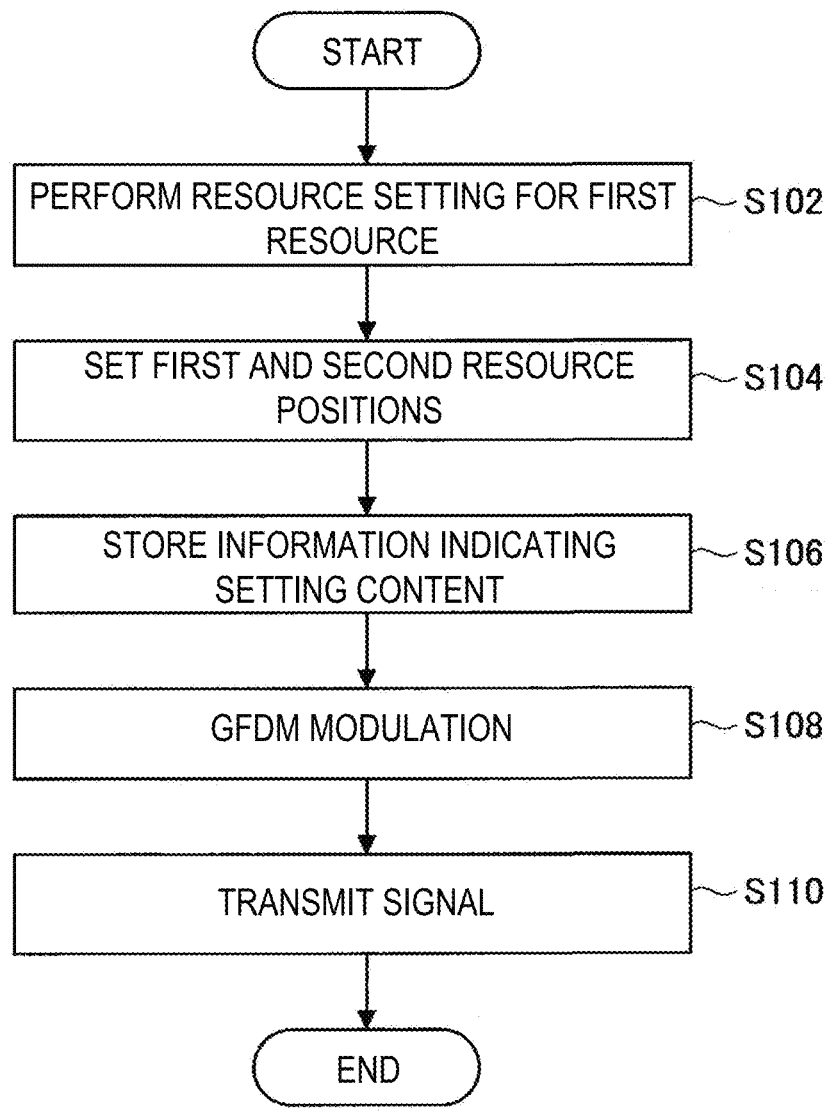
FIG. 17 is a flowchart illustrating an example of a flow of a transmission process executed in a base station according to the present embodiment.

FIG. 17 is a flowchart illustrating an example of the flow of the transmission process executed in the base station 100 according to the present embodiment. As illustrated in FIG. 17, the base station 100 first performs resource setting (i.e., setting of subsymbol length and setting of subcarrier frequency, or the number of subcarriers and the number of subsymbols in a unit resource) for the first resource (step S102). Next, the base station 100 sets the position of the second resource (step S104). For example, the base station 100 sets the timing (i.e., cycle) of the second resource, the time length of the second resource, and the like. In addition, in the case where carrier aggregation is performed, the base station 100 further sets a carrier for transmitting the second resource. Next, the base station 100 stores information indicating the setting content in system information (step S106). For example, the base station 100 stores GFDM setting information indicating the resource setting of the first resource in an MIB or an SIB, and stores information for identifying the position of the second resource in a synchronization signal. The base station 100 then performs GFDM modulation on transmission data mapped to the resources in accordance with the above-described setting (step S108), and performs transmission (step S110).

Figure 18:
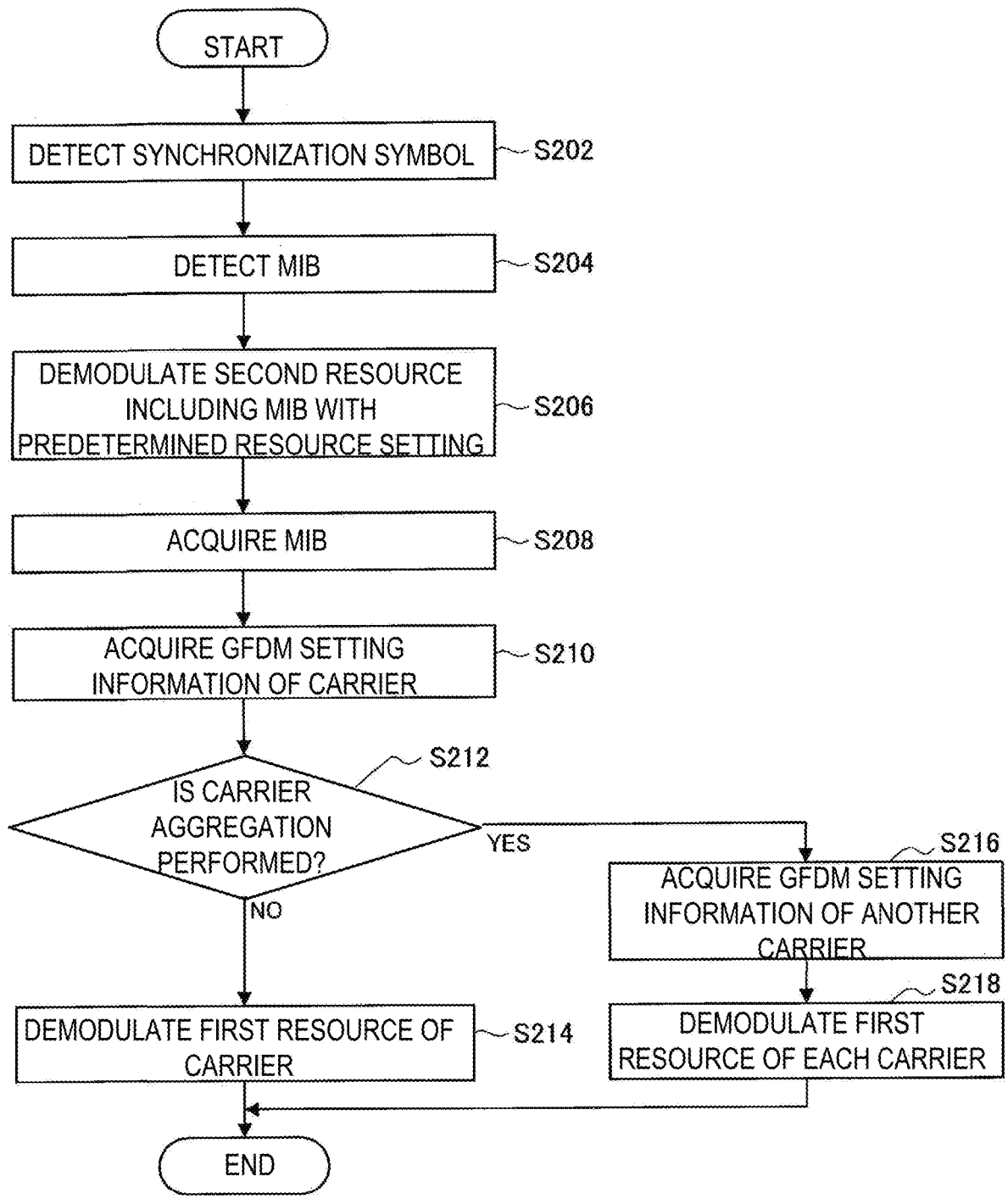
FIG. 18 is a flowchart illustrating an example of a flow of a reception process executed in a terminal apparatus according to the present embodiment.

FIG. 18 is a flowchart illustrating an example of a flow of a reception process executed in the terminal apparatus 200 according to the present embodiment. As illustrated in FIG. 18, the terminal apparatus 200 first detects a symbol such as a PSS or an SSS for synchronization, and establishes synchronization (step S202). Next, the terminal apparatus 200 detects an MIB including the most basic system information that can be relatively calculated from the position of the synchronization symbol (step S204). Next, the terminal apparatus 200 demodulates the second resource including the MIB with predetermined resource setting (i.e., setting in which the time length of a subsymbol has a predetermined value, and the bandwidth of a subcarrier has a predetermined value) (step S206) to acquire the MIB (step S208). The terminal apparatus 200 then acquires the GFDM setting information of the carrier from the MIB (step S210). Next, the terminal apparatus 200 determines whether or not carrier aggregation is performed (step S212). In the case where it is determined that carrier aggregation is not performed (step S212/NO), the terminal apparatus 200 uses the GFDM setting information to demodulate the first resource (step S214). Meanwhile, in the case where it is determined that carrier aggregation is performed (step S212/YES), the terminal apparatus 200 acquires the GFDM setting information of a still another carrier from the MIB (step S216). The terminal apparatus 200 then uses the GFDM setting information corresponding to each carrier to demodulate the first resource of each carrier (step S218).

5. APPLICATION EXAMPLES

The technology according to the present disclosure is applicable to various products. The base station 100 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of structural elements of the base station 100 may be realized in a base station apparatus or a module for a base station apparatus.

Further, the terminal apparatus 200 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 200 may be implemented as a machine type communication (MTC) terminal for establishing a machine to machine (M2M) communication. Furthermore, at least some of structural elements of the terminal apparatus 200 may be implemented as a module (e.g., integrated circuit module including a single die) that is mounted on these terminals.

<5.1. Application Examples for Base Station>

First Application Example

Figure 19:
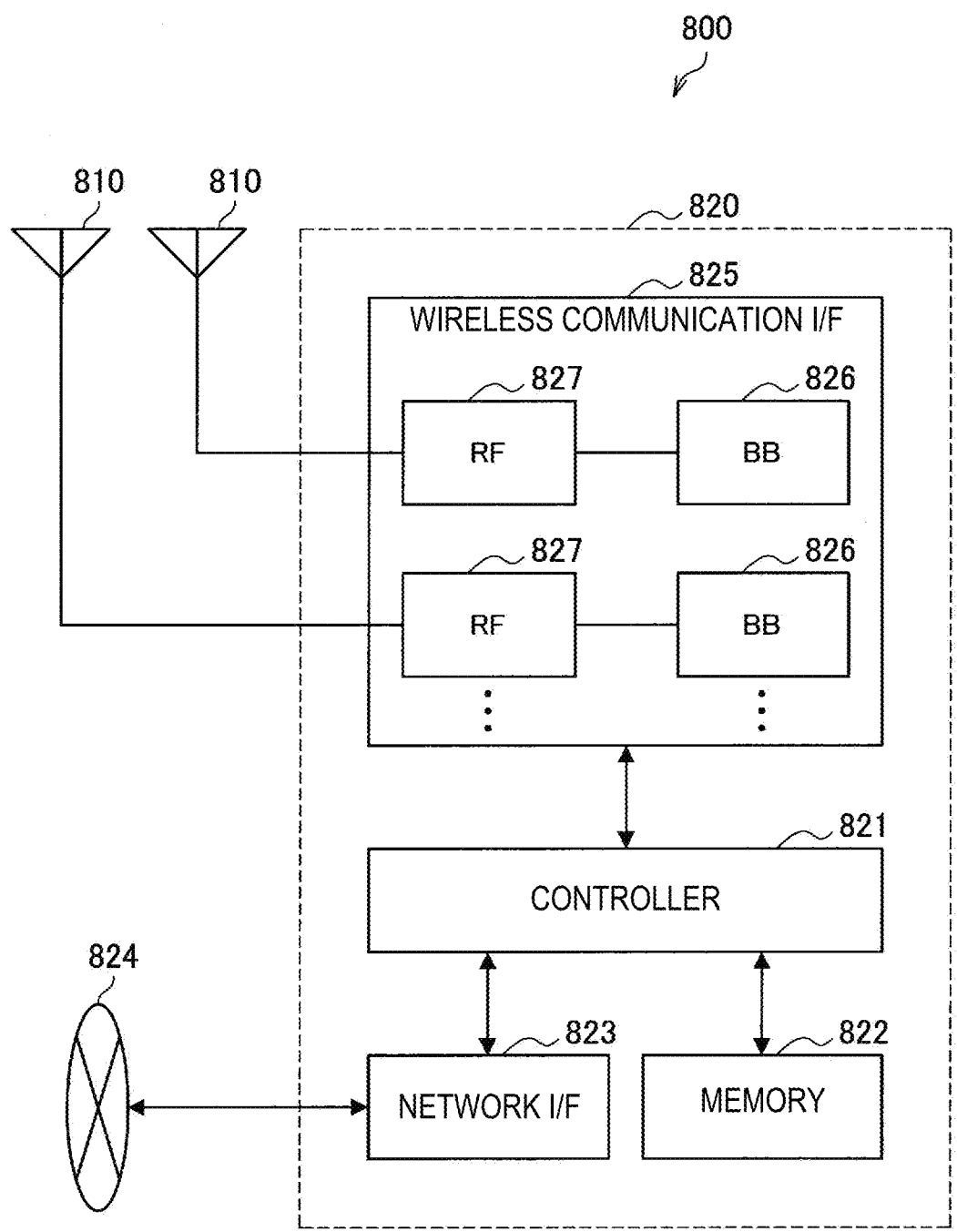
FIG. 19 is a block diagram illustrating a first example of a schematic configuration of an eNB.

FIG. 19 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 19, and the plurality of antennas 810 may, for example, correspond to a plurality of frequency bands used by the eNB 800. It should be noted that while FIG. 19 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 19, and the plurality of BB processors 826 may, for example, correspond to a plurality of frequency bands used by the eNB 800. Further, the wireless communication interface 825 may also include a plurality of the RF circuits 827, as illustrated in FIG. 19, and the plurality of RF circuits 827 may, for example, correspond to a plurality of antenna elements. Note that FIG. 19 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 19, one or more components (the setting unit 151, the notification unit 153, and/or the transmission processing unit 155) included in the processing unit 150 described with reference to FIG. 6 may be implemented in the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 19, the wireless communication unit 120 described with reference to FIG. 5 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 20:
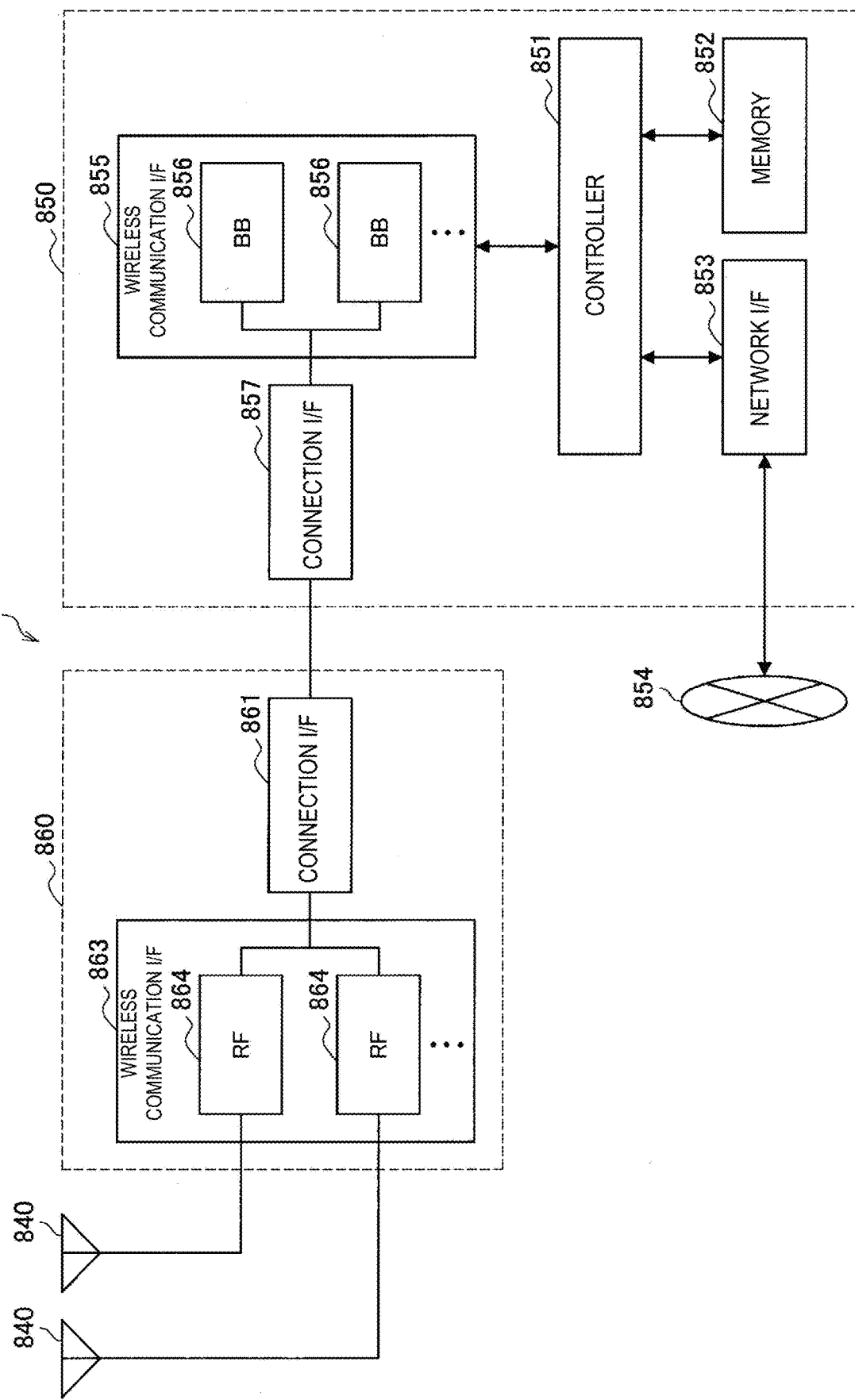
FIG. 20 is a block diagram illustrating a second example of a schematic configuration of an eNB.

FIG. 23 20 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 20, and the plurality of antennas 840 may, for example, correspond to a plurality of frequency bands used by the eNB 830. Note that FIG. 20 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 19.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 19 except that the BB processor 856 is connected to an RF circuit 864 of the RRH 860 via the connection interface 857. The wireless communication interface 855 may include a plurality of the BB processors 856, as illustrated in FIG. 20, and the plurality of BB processors 856 may, for example, correspond to a plurality of frequency bands used by the eNB 830. Note that FIG. 20 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 20, and the plurality of RF circuits 864 may, for example, correspond to a plurality of antenna elements. Note that FIG. 20 illustrates an example in which the wireless communication interface 863 includes the plurality of RF circuits 864, but the wireless communication interface 863 may include the single RF circuit 864.

In the eNB 830 illustrated in FIG. 20, one or more components (the setting unit 151, the notification unit 153, and/or the transmission processing unit 155) included in the processing unit 150 described with reference to FIG. 6 may be implemented in the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 20, for example, the wireless communication unit 120 described with reference to FIG. 6 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

<5.2. Application Examples for Terminal Apparatus>

First Application Example

Figure 21:
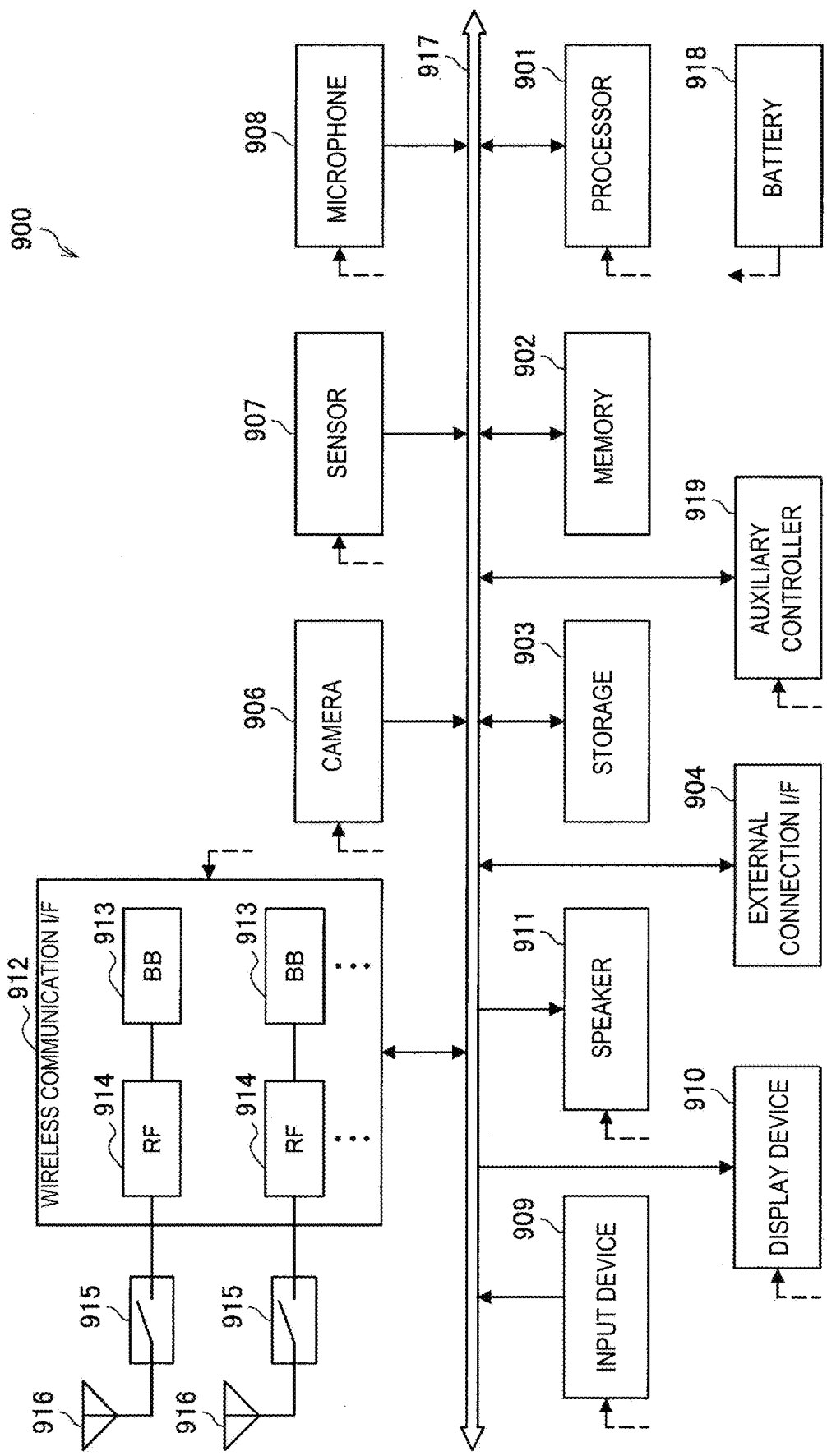
FIG. 21 is a block diagram illustrating an example of a schematic configuration of a smartphone.

FIG. 21 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 21. Note that FIG. 21 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 21. Note that FIG. 21 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other.

The battery 918 supplies electric power to each block of the smartphone 900 illustrated in FIG. 21 via a feeder line that is partially illustrated in the figure as a dashed line. The auxiliary controller 919, for example, operates a minimally necessary function of the smartphone 900 in a sleep mode.

In the smartphone 900 illustrated in FIG. 21, one or more structural elements included in the processing unit 240 (the acquisition unit 241 and/or the reception processing unit 243) described with reference to FIG. 7 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 21, for example, the wireless communication unit 220 described with reference to FIG. 7 may be implemented by the wireless communication interface 912 (for example, the RF circuit 914). Moreover, the antenna unit 210 may be implemented by the antenna 916. Further, the storage unit 230 may be implemented by the memory 902.

Second Application Example

Figure 22:
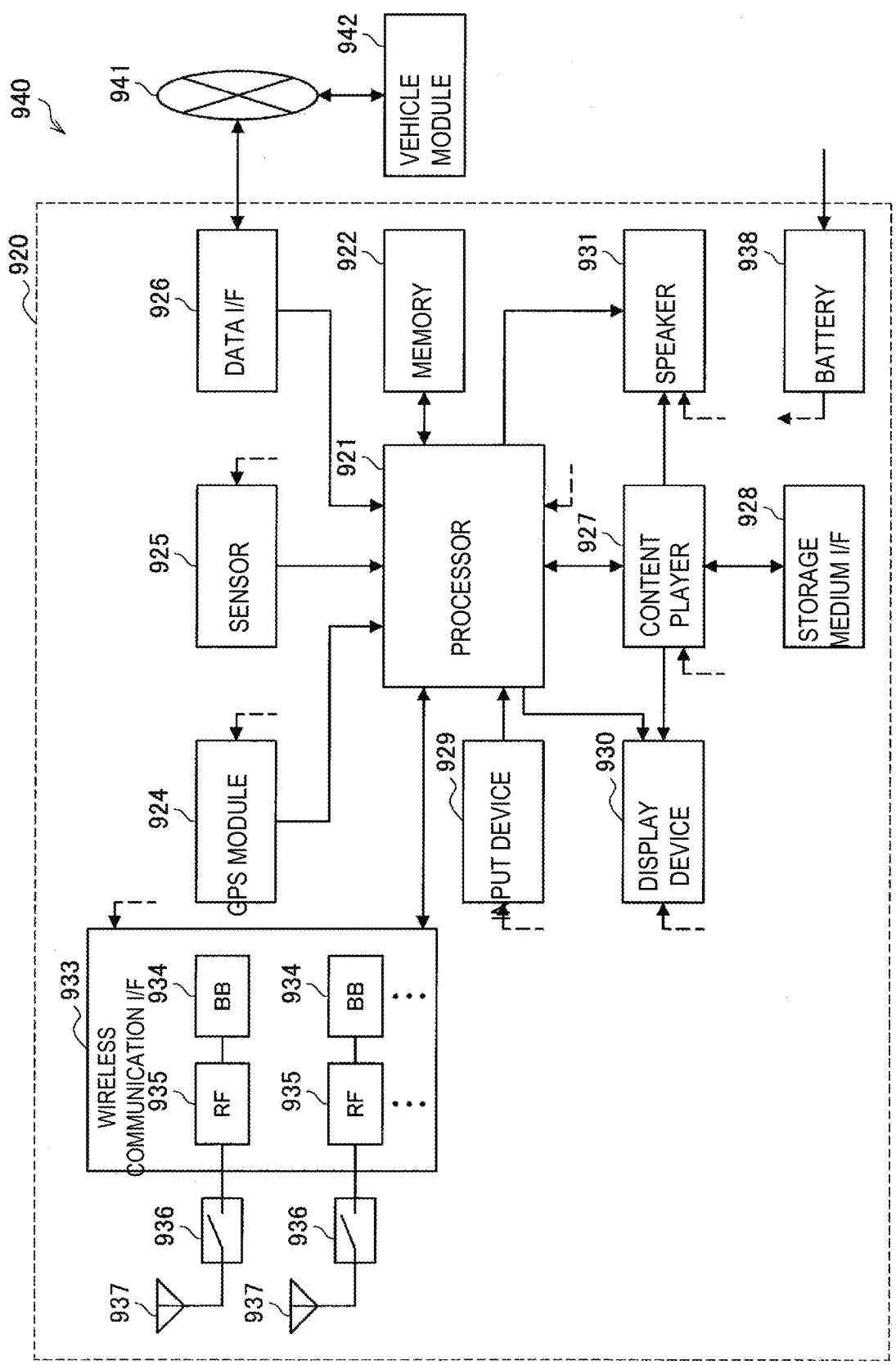
FIG. 22 is a block diagram illustrating an example of a schematic configuration of a car navigation apparatus.

FIG. 22 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 25. Note that FIG. 25 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 25. Note that FIG. 25 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 22 via a feeder line that is partially illustrated in the figure as a dashed line. Further, the battery 938 accumulates the electric power supplied from the vehicle.

In the car navigation apparatus 920 illustrated in FIG. 22, one or more structural elements included in the processing unit 240 (the acquisition unit 241 and/or the reception processing unit 243) described with reference to FIG. 7 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 22, for example, the wireless communication unit 220 described with reference to FIG. 6 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as an apparatus including the acquisition unit 241 and the reception processing unit 243. The vehicle module 942 generates vehicle data such as vehicle speed, engine speed, and trouble information, and outputs the generated data to the in-vehicle network 941.

6. CONCLUSION

The above describes an embodiment of the present disclosure in detail with reference to FIGS. 1 to 22. As described above, the base station 100 variably sets at least any of the bandwidth of the subcarriers or the time length of the subsymbols in the first resource, and stores information indicating the resource setting of the first resource in the second resource in which predetermined values are set for the bandwidth of the subcarriers and the time length of the subsymbols. This allows the information indicating the resource setting of the first resource to be stored in the second resource of the bandwidth of the subcarriers and the time length of the subsymbols, which are also known to the terminal apparatus 200 side. Therefore, the terminal apparatus 200 demodulates the second resource, and can acquire the information indicating the resource setting of the first resource more easily. The terminal apparatus 200 can also demodulate the first resource more easily on the basis of the acquired information. In this way, it there is provided a mechanism capable of appropriately notifying the reception side of the resource setting for GFDM modulation on the transmission side.

Such a mechanism is also effective for carrier aggregation. For example, the first resource and the second resource in which the GFDM setting information of the first resource is stored may be transmitted in different carriers. That is, a certain carrier may store the GFDM setting information of another carrier. Therefore, the GFDM setting information of a plurality of carriers can be included in one carrier together, and a notification can be efficiently issued.

In addition, the primary cell may include the GFDM setting information of the secondary cell. Therefore, the terminal apparatus 200 can acquire the GFDM setting information of each carrier even without demodulating each carrier, and omit monitoring the secondary cell. Accordingly, it is possible to considerably reduce power to be consumed.

Further, the base station 100 increases the number of subsymbols of a specific carrier and enlarges the subcarrier band among carriers to be aggregated. This easily allows the base station 100 to secure carriers for easing the frequency accuracy of the terminal apparatus 200. Such a method is expected to improve the carrier frequency followability of the terminal apparatus 200 when the terminal apparatus 200 is moving at high speed, sleeping for a long time, or the like, and reduces the frequency of retransmission and communication delay.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, it has been described that the base station 100 is the transmission apparatus, and the terminal apparatus 200 is the reception apparatus has been described, but the present technology is not limited to this example. For example, the terminal apparatus 200 may be the transmission apparatus, and the base station 100 may be the reception apparatus. In addition, the present technology is not limited to communication between the base station and the terminal, but the present technology is also applicable, for example, to device-to-device (D2D) communication, vehicle-to-X (V2X) communication, and the like.

Further, the processes described using the flowcharts and the sequence diagrams in this specification need not be necessarily executed in the described order. Several process steps may be executed in parallel. Further, an additional process step may be employed, and some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An apparatus including:
a processing unit configured to variably set at least any of bandwidth of a subcarrier or time length of a subsymbol in a first resource, and store information indicating setting content of the first resource in a second resource in which predetermined values are set for the bandwidth of the subcarrier and the time length of the subsymbol.

(2)
The apparatus according to (1), in which
the first resource and the second resource in which the information indicating the setting content of the first resource is stored are transmitted in a same frequency band.

(3)
The apparatus according to (1) or (2), in which
the first resource and the second resource in which the information indicating the setting content of the first resource is stored are transmitted in different frequency bands.

(4)
The apparatus according to (3), in which
a frequency band that includes the second resource in which the information indicating the setting content of the first resource is stored is a primary cell, and a frequency band that does not include the second resource in which the information indicating the setting content of the first resource is stored is a secondary cell.

(5)
The apparatus according to (3) or (4), in which
among a plurality of frequency bands that are transmitted, an entirety of at least one frequency band is the second resource, and an entirety of another frequency band is the first resource.

(6)
The apparatus according to any one of (1) to (5), in which
the information indicating the setting content of the first resource is included in system information.

(7)
The apparatus according to (6), in which
every piece of or some of pieces of system information that are periodically transmitted are stored in the second resource.

(8)
The apparatus according to (6) or (7), in which
a part or an entirety of the system information is stored in the second resource.

(9)
The apparatus according to any one of (6) to (8), in which
the system information is a master information block (MIB).

(10)
The apparatus according to any one of (6) to (8), in which
the system information is a system information block (SIB).

(11)
The apparatus according to any one of (1) to (5), in which
the information indicating the setting content of the first resource is included in an individual signaling message.

(12)
The apparatus according to any one of (1) to (11), in which
information for identifying a position of the second resource is included in system information.

(13)
The apparatus according to any one of (1) to (11), in which
information for identifying a position of the second resource is included in a synchronization signal.

(14)
The apparatus according to any one of (1) to (13), in which
the predetermined value set for the time length of the subsymbol in the second resource is time length of a symbol in orthogonal frequency-division multiplexing (OFDM).

(15)
The apparatus according to any one of (1) to (14), in which
the predetermined value set for the bandwidth of the subcarrier in the second resource is bandwidth of a subcarrier in OFDM.

(16)
The apparatus according to any one of (1) to (15), in which
the information indicating the setting content of the first resource is an index corresponding to the setting content of the first resource.

(17)
The apparatus according to any one of (1) to (16), in which
the processing unit performs filtering on the first resource and the second resource for each subcarrier.

(18)
An apparatus including:
a processing unit configured to demodulate a second resource in which information indicating setting content of a first resource in which at least any of bandwidth of a subcarrier or time length of a subsymbol is variably set is stored, and predetermined values are set for the bandwidth of the subcarrier and the time length of the subsymbol, and demodulate the first resource on a basis of the information indicating the setting content of the first resource.

(19)
A method including:
variably setting at least any of bandwidth of a subcarrier or time length of a subsymbol in a first resource, and storing, by a processor, information indicating setting content of the first resource in a second resource in which predetermined values are set for the bandwidth of the subcarrier and the time length of the subsymbol.

(20)
A method including:
demodulating a second resource in which information indicating setting content of a first resource in which at least any of bandwidth of a subcarrier or time length of a subsymbol is variably set is stored, and predetermined values are set for the bandwidth of the subcarrier and the time length of the subsymbol, and demodulating, by a processor, the first resource on a basis of the information indicating the setting content of the first resource.

(21)
A program for causing a computer to function as:
a processing unit configured to variably set at least any of bandwidth of a subcarrier or time length of a subsymbol in a first resource, and store information indicating setting content of the first resource in a second resource in which predetermined values are set for the bandwidth of the subcarrier and the time length of the subsymbol.

(22)
A program for causing a computer to function as:
a processing unit configured to demodulate a second resource in which information indicating setting content of a first resource in which at least any of bandwidth of a subcarrier or time length of a subsymbol is variably set is stored, and predetermined values are set for the bandwidth of the subcarrier and the time length of the subsymbol, and demodulate the first resource on a basis of the information indicating the setting content of the first resource.

REFERENCE SIGNS LIST 1 system
100 base station
110 antenna unit
120 wireless communication unit
130 network communication unit
140 storage unit
150 processing unit
151 setting unit
153 notification unit
155 transmission processing unit
200 terminal apparatus
210 antenna unit
220 wireless communication unit
230 storage unit
240 processing unit
241 acquisition unit
243 reception processing unit

The invention claimed is:

1. An apparatus comprising:
circuitry configured to
variably set bandwidth of a subcarrier in a first radio resource, and
transmit information indicating setting content of the first radio resource in a second radio, wherein the second radio resource has predetermined values set for the variably set bandwidth of the subcarrier, wherein
the circuitry is configured to transmit, in different frequency bands, from the first radio resource and the second radio resource information indicating the setting content of the first radio resource,
a frequency band that includes the second radio resource in which the information indicating the setting content of the first radio resource is transmitted is a frequency band of a primary cell, and
a frequency band that does not include the second radio resource in which the information indicating the setting content of the first radio resource is transmitted is a frequency band of a secondary cell.

2. The apparatus according to claim 1, wherein the circuitry is configured to transmit, in a same frequency band, from the first radio resource and the second radio resource information indicating the setting content of the first radio resource.

3. The apparatus according to claim 1, wherein the information indicating the setting content of the first radio resource is included in system information.

4. The apparatus according to claim 3, wherein every piece of or some of pieces of system information that are periodically transmitted are in the second radio resource.

5. The apparatus according to claim 3, wherein a part or an entirety of the system information is transmitted in the second radio resource.

6. The apparatus according to claim 3, wherein the system information is a master information block (MIB).

7. The apparatus according to claim 1, wherein the information indicating the setting content of the first radio resource is included in an individual signaling message.

8. The apparatus according to claim 1, wherein information for identifying a position of the second radio resource is included in system information.

9. The apparatus according to claim 1, wherein information for identifying a position of the second radio resource is included in a synchronization signal.

10. The apparatus according to claim 1, wherein a predetermined value set for a time length of a symbol in the second radio resource is a time length of a symbol in orthogonal frequency-division multiplexing (OFDM).

11. The apparatus according to claim 1, wherein a predetermined value set for the variably set bandwidth of the subcarrier in the second radio resource is a bandwidth of a subcarrier in orthogonal frequency-division multiplexing (OFDM).

12. The apparatus according to claim 1, wherein the information indicating the setting content of the first radio resource is an index corresponding to the setting content of the first radio resource.

13. The apparatus according to claim 1, wherein the predetermined values are predetermined in the circuitry.

14. An apparatus comprising:
circuitry configured to
variably set bandwidth of a subcarrier in a first radio resource, and
transmit information indicating setting content of the first radio resource in a second radio, wherein the second radio resource has predetermined values set for the variably set bandwidth of the subcarrier, wherein
the circuitry is configured to transmit, in different frequency bands, from the first radio resource and the second radio resource information indicating the setting content of the first radio resource, and
among a plurality of frequency bands that are transmitted, an entirety of at least one frequency band is the second radio resource, and an entirety of another frequency band is the first radio resource.

15. An apparatus comprising:
circuitry configured to
receive information and data transmitted by a first radio resource and a second radio resource,
receive, in different frequency bands, from the first radio resource and the second radio resource information indicating the setting content of the first radio resource, wherein
a frequency band that includes the second radio resource in which the information indicating the setting content of the first radio resource is received is a frequency band of a primary cell, and
a frequency band that does not include the second radio resource in which the information indicating the setting content of the first radio resource is received is a frequency band of a secondary cell
demodulate information transmitted by the second radio resource in which information indicating setting content of the first radio resource in which bandwidth of a subcarrier of the first radio resource is variably set and predetermined values are set for the variably set bandwidth of the subcarrier, and
demodulate transmission data mapped to the first radio resource on a basis of the information indicating the setting content of the first radio resource.

16. The apparatus according to claim 15, wherein the predetermined values are predetermined in the circuitry.

17. A method comprising:
variably setting, using circuitry, at least bandwidth of a subcarrier in a first radio resource,
transmitting, by the circuitry, information indicating setting content of the first radio resource in a second radio resource, wherein the second radio resource has predetermined values set for the variably set bandwidth of the subcarrier and information for identifying a position of the second radio resource is included in at least one of system information and a synchronization signal, and
controlling modulation and transmission of information and transmission data mapped to the first radio resource and the second radio resource to the receiving terminal.

18. A method comprising:
receiving, using circuitry, information and data transmitted by a first radio resource and a second radio resource, wherein information for identifying a position of the second radio resource is included in at least one of system information and a synchronization signal,
demodulating, using the circuitry, information transmitted by the second radio resource in which information indicating setting content of the first radio resource in which a bandwidth of a subcarrier of the first radio resource is variably set and predetermined values are set for the variably set bandwidth of the subcarrier, and
demodulating, using the circuitry, transmission data mapped to the first radio resource on a basis of the information indicating the setting content of the first radio resource.

* * * * *